(12) United States Patent
Shi

(10) Patent No.: US 11,398,000 B2
(45) Date of Patent: Jul. 26, 2022

(54) METHODS AND SYSTEMS FOR MACHINE-LEARNING FOR PREDICTION OF GRID CARBON EMISSIONS

(71) Applicant: SINGULARITY ENERGY, INC., Cambridge, MA (US)

(72) Inventor: Wenbo Shi, Cambridge, MA (US)

(73) Assignee: SINGULARITY ENERGY, INC., Cambridge, MA (US)

( * ) Notice: Subject to any disclaimer, the term of this patent is extended or adjusted under 35 U.S.C. 154(b) by 129 days.

(21) Appl. No.: 16/879,303

(22) Filed: May 20, 2020

(65) Prior Publication Data
US 2020/0372588 A1 Nov. 26, 2020

Related U.S. Application Data

(60) Provisional application No. 62/850,361, filed on May 20, 2019.

(51) Int. Cl.
*G06Q 50/06* (2012.01)
*G06N 20/00* (2019.01)
*G06N 3/08* (2006.01)

(52) U.S. Cl.
CPC .......... *G06Q 50/06* (2013.01); *G06N 3/08* (2013.01); *G06N 20/00* (2019.01)

(58) Field of Classification Search
USPC ...................................................... 700/291
See application file for complete search history.

(56) References Cited

U.S. PATENT DOCUMENTS

| | | | |
|---|---|---|---|
| 2011/0082596 A1* | 4/2011 | Meagher | H02J 13/00001 700/291 |
| 2012/0252525 A1* | 10/2012 | Frenger | H04W 52/0206 455/524 |
| 2015/0134550 A1* | 5/2015 | Sroufe | G06Q 30/018 705/317 |
| 2018/0031533 A1* | 2/2018 | Rawat | G01N 33/0036 |
| 2018/0347406 A1* | 12/2018 | Friesth | F24S 25/50 |

(Continued)

OTHER PUBLICATIONS

Khan et al., "Load forecasting, dynamic pricing and DSM in smart grid: A review," Renewable and Sustainable Energy Reviews, 2015, 35pg. (Year: 2015).*

(Continued)

*Primary Examiner* — Ryan D. Coyer
(74) *Attorney, Agent, or Firm* — Caldwell Intellectual Property Law

(57) ABSTRACT

A system for machine-learning for prediction grid carbon emissions includes a computing device configured to receive, from a first local grid monitoring device monitoring a first local grid, a plurality of first power output quantities of a plurality of power generators in the first local grid, train an emission projection machine-learning process, wherein training further includes compiling a plurality of training data entries, each training data entry correlating a plurality of past power output quantities with at least a reported carbon emission datum and training the emission projection machine-learning process using the plurality of training data entries, and generate, using the emission projection machine-learning process, a projected carbon emission rate as a function of the plurality of power output quantities.

20 Claims, 10 Drawing Sheets

(56) References Cited

U.S. PATENT DOCUMENTS

2019/0095804 A1\* 3/2019 Mukherjea ............. G06N 5/043
2020/0027096 A1\* 1/2020 Cooner ................ G06Q 20/308
2020/0272625 A1\* 8/2020 Brumby ................ G06Q 10/04

OTHER PUBLICATIONS

Ota et al., "Predicting Transportation Carbon Emission with Urban Big Data," IEEE, 2017, 12pg. (Year: 2017).\*
Ramchurn et al., "Agent-Based Homeostatic Control for Green Energy in the Smart Grid," ACM, 2011, 26pg. (Year: 2011).\*
Rolnick, et al., "Tackling Climate Change with Machine Learning," Nov. 2019, 111pg. (Year: 2019).\*

\* cited by examiner

METHODS AND SYSTEMS FOR MACHINE-LEARNING FOR PREDICTION OF GRID CARBON EMISSIONS

CROSS-REFERENCE TO RELATED APPLICATIONS

This application claims the benefit of priority of U.S. Provisional Patent Application Ser. No. 62/850,361, filed on May 20, 2019, and titled "Estimating, Learning, and Optimizing Real-Time Emissions for Energy and Sustainability Management," which is incorporated by reference herein in its entirety.

FIELD OF THE INVENTION

The present invention generally relates to the field of artificial intelligence. In particular, the present invention is directed to methods and systems for machine-learning for prediction grid carbon emissions.

BACKGROUND

Minimal carbon emissions are an increasingly vital objective in industry and technology. However, lack of real-time visibility and transparence owing to existing static data collection and estimation techniques significantly limits ability to monitor and manage emissions efficiently. Therefore, existing solutions render it difficult to meet the increasing demands on corporate sustainability.

SUMMARY OF THE DISCLOSURE

In an aspect a method of machine-learning for prediction grid carbon emissions includes receiving, by a computing device and from a first local grid monitoring device monitoring a first local grid, a plurality of first power output quantities of a plurality of power generators in the first local grid, training, by the computing device, an emission projection machine-learning process, wherein training includes compiling a plurality of training data entries, each training data entry correlating a plurality of past power output quantities with at least a reported carbon emission datum and training the emission projection machine-learning process using the plurality of training data entries, and generating, using the emission projection machine-learning process, a projected carbon emission rate as a function of the plurality of power output quantities.

In another aspect a system for machine-learning for prediction grid carbon emissions includes a computing device configured to receive, from a first local grid monitoring device monitoring a first local grid, a plurality of first power output quantities of a plurality of power generators in the first local grid, train an emission projection machine-learning process, wherein training further includes compiling a plurality of training data entries, each training data entry correlating a plurality of past power output quantities with at least a reported carbon emission datum and training the emission projection machine-learning process using the plurality of training data entries, and generate, using the emission projection machine-learning process, a projected carbon emission rate as a function of the plurality of power output quantities.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

Embodiments disclosed herein incorporate new real-time carbon signals from the grid into the optimization of energy resources to minimize emission impacts while maximizing efficiency benefits. In embodiments, artificial intelligence and machine-learning methods are used to estimate real-time emission impacts based on grid data. Deep learning for real-time/online optimization and control may be used to minimize emission impacts while maximizing efficiency benefits under uncertainties of the ambient environment and user behaviors. A result may be a real-time data-driven software platform that implements methods and provides intuitive, compelling real-time visualizations.

Figure 1:
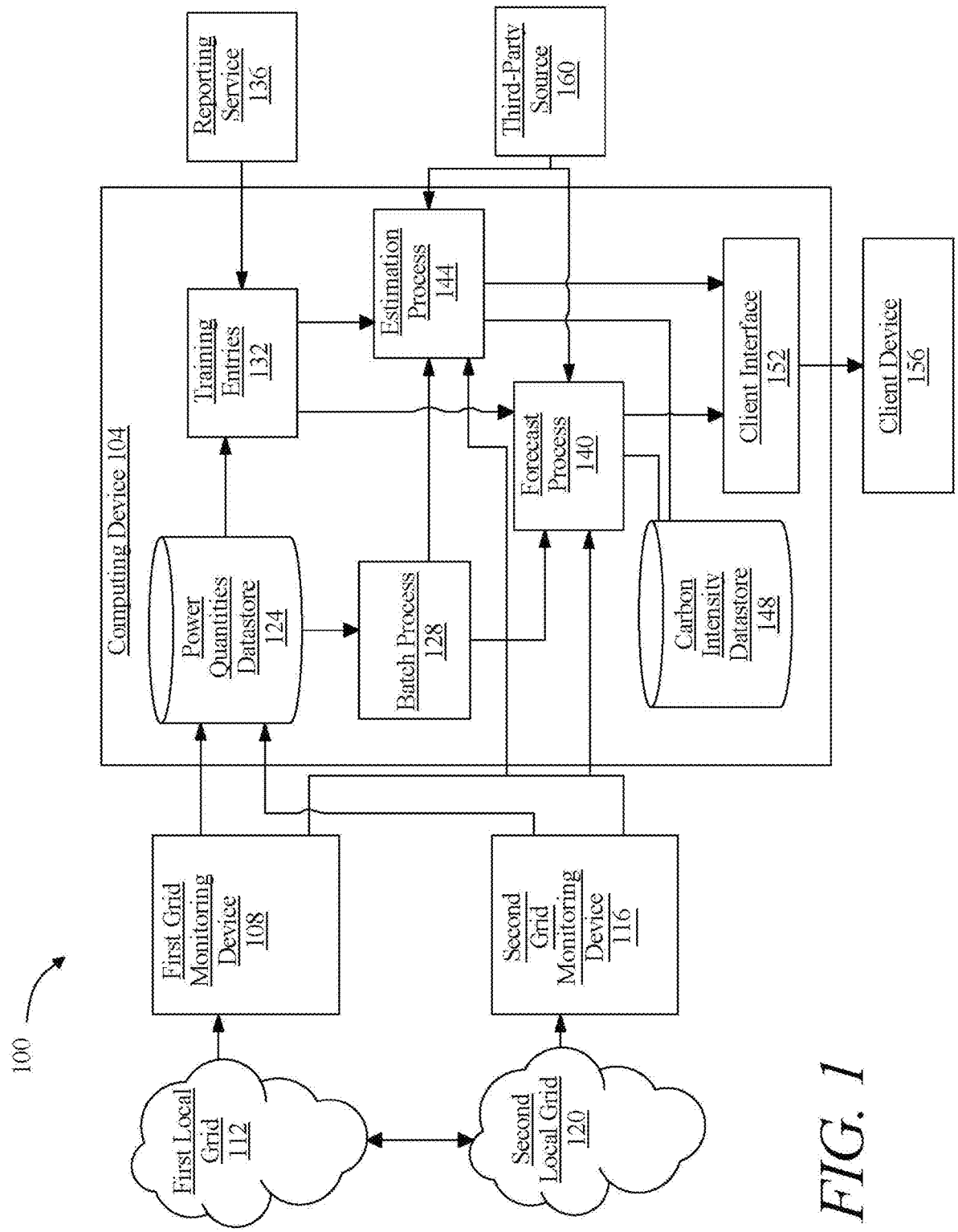
FIG. 1 is a block diagram illustrating an exemplary embodiment of a system for machine-learning for prediction grid carbon emissions.

Referring now to FIG. 1, an exemplary embodiment of a system 100 for machine-learning for prediction grid carbon emissions is illustrated. "Grid carbon emissions," as used in this disclosure, are data regarding emission of atmospheric carbon due to production and/or consumption of electrical energy in an electrical power grid, as set forth in further detail below. System 100 includes a computing device 104. Computing device 104 may include any computing device 104 as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing device 104 operating in concert, in parallel, sequentially or the like; two or more computing devices 104 may be included together in a single computing device 104 or in two or more computing devices 104. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices 104, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices 104 in a first location and a second computing device 104 or cluster of computing devices 104 in a second location. Computing device 104 may include one or more computing devices 104 dedicated to data storage, security, distribution of traffic for load balancing, and the like. Computing device 104 may distribute one or more computing tasks as described below across a plurality of computing devices 104 of computing device 104, which may operate in parallel, in series, redundantly, or in any other manner used for distribution of tasks or memory between computing devices 104. Computing device 104 may be implemented using a "shared nothing" architecture in which data is cached at the worker, in an embodiment, this may enable scalability of system 100 and/or computing device 104.

Computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 is configured to receive one or more power output quantities from a first local grid monitoring device 108. A "local grid monitoring device," as used in this disclosure, is a device operated by an entity that coordinates, monitors, and/or controls operation of an electrical power system and/or power grid, defined here as a "local grid" for which the entity has responsibility; a local grid may be incorporated in a larger national, and/or international power grid. A local grid monitoring device may include, without limitation, a device operated by an independent system operator (ISO) such as ISO New England, New York ISO, California ISO, or the like, a regional transmission organization (RTO) such as the Southwest Power Pool, and/or any other transmission system operator (TSO). A local grid monitoring device may alternatively or additionally include a device operated by an institution, such as without limitation the U.S. Energy Information Administration (EIA), that reports power output quantities and/or related data with regard to one or more local grids and/or grids incorporating one or more local grids. Such institutions and/or devices operated thereby may report power output quantities and/or related data at any rate described herein, including without limitation on an hourly basis; in an embodiment, where one local grid monitoring device, such as an ISO and/or RTO reports data infrequently or irregularly, an institution such as EIA may report more frequently and/or in real time or near real time. For instance, EIA may report data in substantially real time, but with a one-day lag in reporting. A local grid monitoring device may include any device suitable for use as computing device 104 as described above. A "power output quantity," as used in this disclosure, is an amount of power in watts, kilowatts, or the like, being generated by a given power generator, and/or fuel type at a given moment and/or over a given period of time; power output quantities of a plurality of generators may include without limitation fuel mix data, defined for the purposes of this disclosure as data indicating a quantity of electrical power, and/or proportion of electrical power, being produced by a given type of power generator, where types may include without limitation nuclear power, oil power, natural gas power, coal power, hydroelectric power, solar power, wind power or any other category of power plant and/or power generation facility that may occur to persons skilled in the art upon reviewing the entirety of this disclosure. Categories may include higher-level classification such as "renewables," power storage classifications such as "batteries," and/or a category for energy imported from another local power grid, for instance as described in further detail below. In other words, power output quantities may be available as fuel mix data but not per power generator.

Still referring to FIG. 1, local grid monitoring device may be configured to report, using any suitable electronic communication protocol, a plurality of power output quantities of a plurality of power generators in a local grid corresponding to the local grid monitoring device. "Power generators," as used in this disclosure, may include without limitation any kind of power plant or other device contributing to any power grid, including without limitation hydroelectric plants, coal power plants, oil power plants, natural gas power plants, photoelectric solar farms, solar collectors, wind farms, nuclear power plants, geothermal power plants, tidal power plants, or any other power plant and/or power production system that may occur to persons skilled in the art upon reviewing the entirety of this disclosure. For instance, and without limitation, first local grid monitoring device 108 may monitor, and transmit, to devices including computing device 104, power output quantities of power generators in a first local grid 112. As a further example, a second local grid monitoring device 116 may monitor, and transmit to devices including computing device 104, power output quantities of power generators in a second local grid 120. Local grids may exchange power; for instance, first local grid 112 may contain one or more power generators providing power to second local grid 120, for instance and without limitation as described in further detail below.

Still referring to FIG. 1, power output quantities may be reported by a give local power grid monitoring device at a frequency of reporting, which may be regular or irregular. For instance, and without limitation, one local power grid monitoring device may report a power output quantity every 1 minute, while another power grid monitoring device may report a power output quantity every 5 minutes; additional local power grid monitoring devices may report once an hour, once a day or the like. Local power grid monitoring devices and/or other devices communicating with computing device 104 may also transmit market data such as locational marginal prices (LMPs), load forecast or the like. Data provided by local power grid monitoring devices may include any data described below.

With continued reference to FIG. 1, received power output quantities may be stored in a power quantities data store may be implemented, without limitation, as a relational database, a key-value retrieval datastore such as a NOSQL database, or any other format or structure for use as a datastore that a person skilled in the art would recognize as suitable upon review of the entirety of this disclosure. Power quantities data store may include a plurality of data entries and/or records corresponding to user tests as described above. Data entries in a power quantities data store may be flagged with or linked to one or more additional elements of information, which may be reflected in data entry cells and/or in linked tables such as tables related by one or more indices in a relational database. Power quantities data store may be located in memory of computing device 104 and/or on another device in and/or in communication with system 100. Power output quantities may be listed in records describing, without limitation, quantities in of power produced by a power generator and/or category of fuel as in fuel mix data as described above, in kilowatts, percentage and/or proportion of total power flowing through grid of each quantity produced by each power generator, a date and/or time or similar temporal attribute of recording of each power output quantity, an identifier of a power generator that produced the power quantity, whether the power generator was a base power generator or a marginal power generator, or the like. In some cases, as further noted above, operating data, such as without limitation power output quantities, may be reported at the generating-unit and/or power generator level, while in other cases operating data are reported at an aggregate level for all units at a plant with the same fuel type. Whether reported per power generator or as produced by different fuel types, power may be reported in any suitable unit including without limitation megawatts, kilowatts, or the like.

Further referring to FIG. 1, power input quantities may include data indicating that a power input quantity corresponds to marginal power and/or power produced by a marginal fuel type. marginal power generators, collections thereof, and/or fuel types are defined for the purposes of this disclosure as power generators, collections of power generators, and/or fuel types that respond to a change in demand at a given time; such marginal plants, power generators and/or fuel types may include plants, power generators and/or fuel types having readily variable outputs, such as natural gas power plants, coal power plants, oil power plants, wind, or the like. A marginal fuel type may be indicated using a marginal fuel type flag, which may be any suitable datum and/or data field usable to indicate whether a given fuel type, power generator, and/or collection of power generators, and/or collection of fuel types is marginal as described above.

Still referring to FIG. 1, computing device 104 may perform one or more processes, as described below, using techniques including machine learning, optimization, and the like to determine current carbon emission rates, also referred to in this disclosure as "carbon intensity," "grid carbon intensity," "grid emission rate," and/or "grid emission factor." As used in this disclosure, a "current carbon emission rate" is a rate by mass of carbon released into the atmosphere per unit of power produced in a power grid such as local power grid, and/or per unit of power consumed from a power grid such as local power grid, as corresponding to production-based or consumption-based carbon intensity respectively; units of carbon intensity may include without limitation, kilograms per kWh or MWh, tons per kWh or MWh, or the like. "Production-based carbon intensity", as defined in this disclosure, is carbon intensity accounting for emissions of local power production. "Consumption-based carbon intensity," as used herein, is carbon intensity accounting for indirect emissions caused by grid power consumed from a local grid by an entity such as a building, business, one or more items of machinery and/or power storage, or the like. Production-based carbon intensity measures the average emissions impact of every MWh produced by power generators on a local grid. Consumption-based carbon intensity measures the average emission impact of every MWh or similar unit consumed. In an embodiment consumption-based carbon intensity may be used by system 100 and/or one or more consumers of power from system 100 to quantify and/or optimize emissions impact of one or more consumers of power from system. Production-based carbon intensity may be used as a substitute for consumption-based carbon intensity in situations where the two numbers would be similar, for instance and without limitation if there is no power import in the local power grid or the import is negligible. In an embodiment, consumption-based carbon intensity may be calculated per consumer of power. This may enable system 100 and/or consumer to match consumption and carbon intensity temporally; methods and systems disclosed herein may make it possible to align consumption and carbon intensity at the same time when calculating emissions. Processes described in this disclosure may improve granularity of the grid emission factors. Grid emission factors vary by location, season, and time-of-day. However, currently existent grid emission factor numbers are provided in annual average data, which can't capture seasonality or time-of-day effect. Use of processes as described herein may permit provision of data with high temporal resolution, such as data provided in five-minute, 15-min, hourly, or monthly average temporal increments; temporal increments may be set to match with a desired granularity, such as a desired granularity of consumption data. In addition, calculation and/or projection of consumption-based carbon intensity as described herein may enable matching of consumption of energy and grid emission factors temporally: existing grid emission factors are generally outdated, and often two to four years old, and as annual values are not granular enough to meet that requirement. Methods described herein may ensure that grid emission factors match with consumption temporally. Embodiments described in this disclosure may match time resolution to meter reading resolution; for instance, embodiments may use a real-time grid emission factor for sites with real-time electricity data and monthly grid emission factor for sites with only monthly meter reads.

Continuing to refer to FIG. 1, carbon intensity may be calculated, transmitted, and/or received in the form of a "carbon emission factor" for a given fuel type or the like, defined for the purposes of this disclosure as an average emission rate (for instance expressed as carbon/megawatt hour) of power generators with that kind of fuel or the like in that location. A carbon emission factor may be calculated using the environmental protection agency (EPA) historical data or other reporting service historical data and may be used in training data for calculation of current and/or projected carbon intensity and/or marginal carbon intensity as described in further detail below. An emission factor for a given fuel type may indicate average carbon intensity of power generators with that fuel type.

Still referring to FIG. 1, further processes may calculate a projected carbon emission rate, defined for the purposes of this disclosure as one or more values for a current carbon emission rate at a future time or date, and/or a function usable for calculating a carbon emission rates at a series of times and/or over a future time window. Processes may calculate a rate of change in a current carbon emission rate and/or a projected rate of change in carbon emission rate. Processes may calculate marginal carbon intensity and/or marginal emission rate, defined for the purposes of this disclosure as a rate of change in emissions with respect to the change in power generated or consumed in kWh or MWh. Marginal emission rate represents an incremental emission impact if power generation and/or consumption changes. Marginal carbon intensity may be used to calculate avoided emissions due to a reduction in consumption compared with a baseline. Marginal carbon intensity may depend upon a degree to which a marginal power generator and/or fuel type is being employed; thus, marginal carbon intensity may reflect avoided emissions and/or avoided carbon tonnage where power consumption is reduced, because a reduction in marginal carbon intensity may cause a marginal generator to ramp down.

Further referring to FIG. 1, processes may calculate a past carbon tonnage, defined for the purposes of this disclosure as an amount of carbon released into the atmosphere by a local power grid over a period of time prior to a current moment at which a process is performed. Processes may calculate indirect emissions from generation of purchased energy from local grids by consumers. Processes may calculate a projected future carbon tonnage, defined for the purposes of this disclosure as a quantity of carbon that will be released into the atmosphere over some future interval between a present date and/or time and a future date and/or time, between two future dates and/or times, or the like. Processes may calculate avoided past carbon tonnage based on a reduction in carbon consumption and/or marginal emission rate. Processes may calculate projected avoided carbon tonnage, given a projected reduction in carbon consumption and/or marginal emission rate. "Avoided carbon tonnage" is defined for the purposes of this disclosure as a reduction in carbon tonnage emitted owing to a change in power production and/or consumption. In an embodiment, processes may be performed using a batch process 128 that performs processes as described herein on a set of data collected over some past period of time, such as a day, an hour, a week, or the like. Alternatively or additionally, one or more processes as described in this disclosure may be performed in real time as power output quantities are received from local grid monitoring devices.

Continuing to refer to FIG. 1, data from power quantities data store may be used to make a plurality of training entries 132, to be used as training data in processes described in further detail below. "Training data," as used herein, is data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and still referring to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below. Training data used by computing device 104 may correlate any input data as described in this disclosure to any output data as described in this disclosure. As a non-limiting illustrative example inputs to training data may include training data entries, each correlating past power output quantities with at least a reported carbon emission datum. At least a reported carbon emission datum may include any data describing rates of carbon emission, carbon intensity, carbon emission factors, or the like, as reported by a reporting service 136 such as the environmental protection agency (EPA), a state, provincial, and/or local environmental agency, and/or any other organization industry group or the like who is reporting carbon emission data. Such data may be reported per power generator and/or per fuel type, per output of power generator, per local grid, and/or per time interval, which data may be used by computing device 104 to generate training entries 132. In an embodiment, data provided by a reporting service 152 may be two to four years old, at a lower resolution (yearly, quarterly), or the like, and may be in formats that are not readily usable such as in file forms that must be read in and then associated with other data; association of data provided by a reporting service 152 with power output quantities may be performed using machine-learning processes as described in this disclosure.

Still referring to FIG. 1, computing device 104 may use training entries 132 to train one or more machine-learning processes, including without limitation a forecast process 140 such as an emission projection machine-learning process, an estimation process 144, such as used for determination of current rates of carbon emission and/or rates of change thereof, and/or marginal emission rates, and/or other machine-learning processes as described in further detail below. A "machine learning process," as used in this disclosure, is a process that automatedly uses a body of training data to generate an algorithm that will be performed by a computing device 104 and/or model to produce outputs given data provided as inputs; this is in contrast to a non-machine learning software program where the commands to be executed are determined in advance by a user and written in a programming language. In an embodiment training may be used to generate a model and/or algorithm that may be used to generate outputs without further training; in other words, once created during training, model and/or algorithm may be performed on inputs without further reference to training data.

Still referring to FIG. 1, results of machine-learning processes and/or other processes as described below to calculate carbon intensity and/or rate of change thereof may be stored in a carbon intensity datastore 148. Carbon intensity datastore 148 may be implemented in any manner suitable for implementation of power quantities datastore 124 as described above. Process may alternatively or additionally be provided to a client device 156 operated by an end-user such as without limitation a manager who makes energy management decisions, a green technology company, a company attempting to achieve a carbon offset or other environmental mandate, and/or a policy maker. Results may be transmitted via a client interface 152, which may perform one or more optimization, recommendation and/or forecasting outputs in textual and/or graphical form. Results may alternatively or additionally be communicated using an API, for instance as described in further detail below. Client interface 152 may provide a two-way communication interface with client devices 156, including without limitation by means of graphical user interfaces, industry communications protocols such as Modbus, BACnet, IEC 61850, TCP/IP, other proprietary protocols, and/or an API.

In operation, and still referring to FIG. 1, computing device 104 may fetch grid and/or market data from one or more local grid monitoring devices, such as without limitation generation fuel mix, marginal fuel type, system demand, locational marginal prices (LMPs), historical emissions, and emission data from a reporting service 136 such as the EPA. Estimation process 144 and/or forecast and/or models may be built and/or trained using historical data. Real-time grid data from local grid monitoring devices' web services may be ingested into computer and sent to models and/or processes to estimate and predict grid carbon intensities. Results may be stored and then served, for instance using a REST web service according to the RESTful web service protocol generated using the representational state transfer (REST) architectural style, for other applications to access grid carbon intensity data. Models and/or machine-learning processes may be updated and/or validated by benchmarking with ground truth, defined for the purposes of this disclosure as ex-post emission data to ensure model accuracy and reliability; such data may be received, without limitation, from reporting services 136, which may, for instance, provide emission data some period of time, such as a year or more, after real time or batch processes have process outputs. Updates to machine-learning processes and/or models may be performed by adding further training data entries associating newly received reporting service data with corresponding power output quantities, which may be correlated using common temporal data.

Still referring to FIG. 1, computing device may receive one or more additional elements of data which may be used in any process including without limitation machine-learning processes, algorithms, or the like, and/or may be correlated with any other data and/or exogenous signals described in this disclosure as potentially included and/or correlated with other data in training entries 132 and/or training data, including without limitation market data, weather data, holiday data, seasons, consumer meter data, or the like. One or more additional elements of data may be received from any device having access to such data, including one or more third-party sources 160 such as weather services or the like. End-user data from consumers may be produced using meter data, such as without limitation as produced by a smart meter could use in any method as well. Computing device 104 may fetch real-time and historical data including wholesale market data from local grid monitoring devices, retail market data from utilities, carbon intensity data from the local grid monitoring devices and/or a third party, and/or weather data from the National Weather Service and/or a third party. Computing device 104 may connect with a user's main meter which may measure net power from local power grid in real time and the user's controllable energy resources such as energy storage, EV charging, diesel generation, fuel cells, flexible loads, and the like. User's historical metering data may be imported computing from the user's own metering system or a third party that collects metering data from utilities such as a utility API as described in further detail below. Computing device 104 may be able to read real-time status, such as power, state-of-charge for energy storage, or the like of energy resources and also to control them via two-way communications such as ModBus, BACnet, and/or IEC 61850. There may be multiple users receiving data from computing device 104 via graphical user interfaces and/or API. For example, a facility may monitor and control energy resources, a sustainability team may monitor and track emission impacts, an operations team may set operational preferences and monitor the system, and the like. Data produced as described herein may also be accessible to the public to view real-time energy and emission data, for instance to raise public awareness and engage sustainability initiatives. Utilities may interact with computing device 104 to issue grid service requests such as demand response, for instance via OpenADR, and receive responses from computing device 104.

Figure 2:
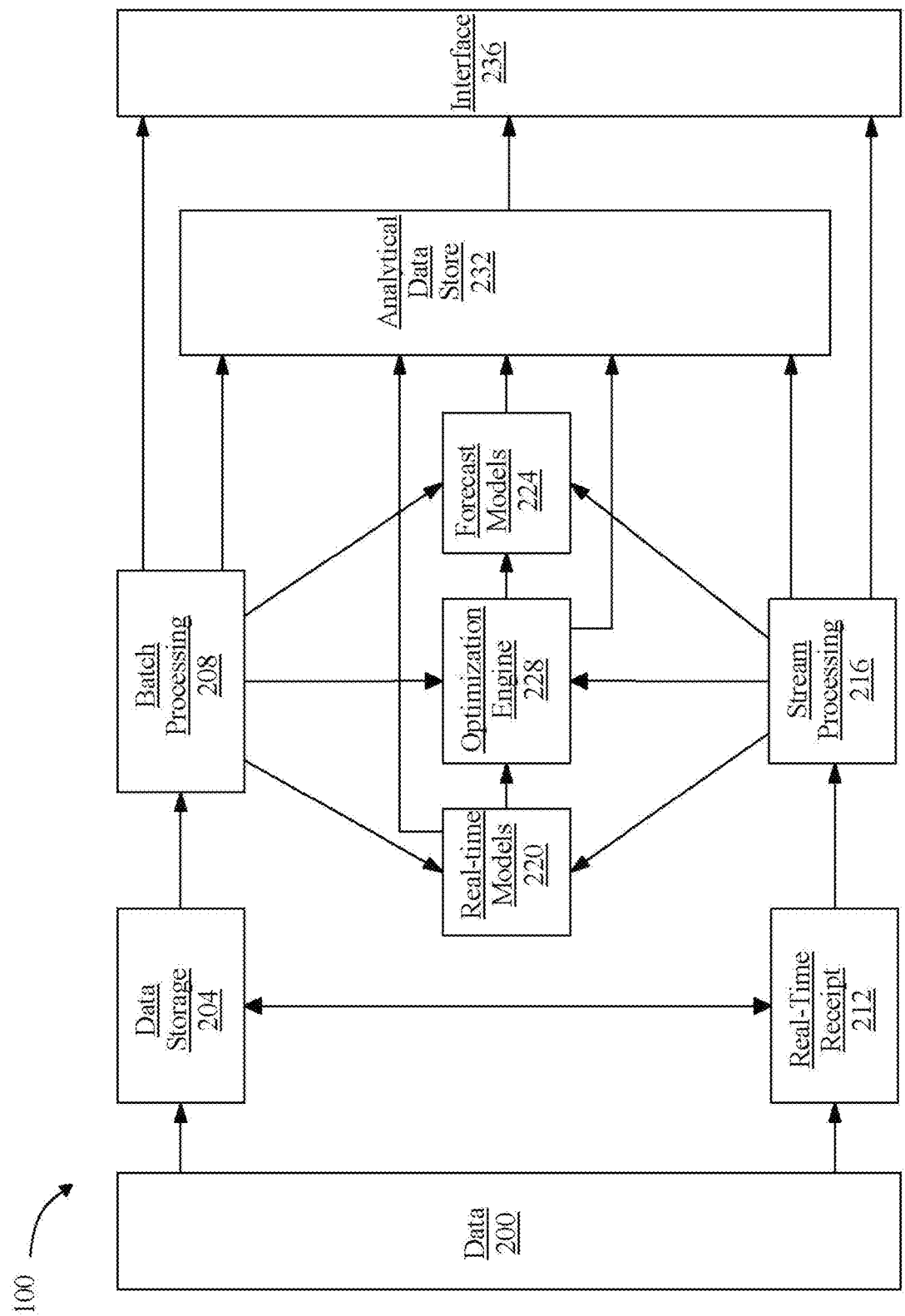
FIG. 2 is a block diagram illustrating an exemplary embodiment of a system for machine-learning for prediction grid carbon emissions.

Referring now to FIG. 2, a block diagram illustrates an exemplary embodiment indicating data flow in system 100 in a non-limiting embodiment. Data 200 may be received, for instance, as described above from one or more local grid monitoring devices; both real-time and historical data may be received. Data 200 may be stored in data storage 204, for instance in a power quantities datastore 124 and/or one or more additional or alternative data storage elements. Stored data may be used in batch processing 208, for instance as described above; batch processing of historical data may be used to perform analytics jobs and learn and update the models periodically. Alternatively or additionally, data may be received in real time 212, and processed, potentially in combination with data from data storage 204, in stream processing 216 whereby real-time analytics and/or other processes are used to produce results, which may continuously update as data is input. Such continuous updates may be used in turn to continuously update API and user interface and/or graph data, providing a continuously evolving and up-to-date window into current, past, and projected emissions. Real-time data streams may be as inputs continuously fed to models, such as real-time models 220 for production of current values such as current carbon intensity and/or cumulative past carbon tonnage and forecast models 224 used for predicting future carbon intensity, past or future carbon tonnage, past or future avoided carbon tonnage, and/or costs; models may generate outputs that are sent to an optimization engine 228. Optimization engine 228 may be used to generate recommended courses of action for optimization of carbon output and/or costs and may produce inputs to forecast models 224. Results of optimization may be used as control decisions that are dispatched to energy resources such as power generators, local grid monitors, or other devices and/or entities making decisions affecting power generation and/or power consumption parameters in local grid. Power consumption parameters may include, without limitation, customers' energy storage, electric vehicle charging, diesel generation, fuel cells, flexible loads, and the like. All of outputs and results may be stored in an analytical data store 232, which may be implemented in any manner suitable for implementation of power quantities datastore 124 as described above and may be accessed via an interface 236 such as a user interface and/or API.

Figure 3:
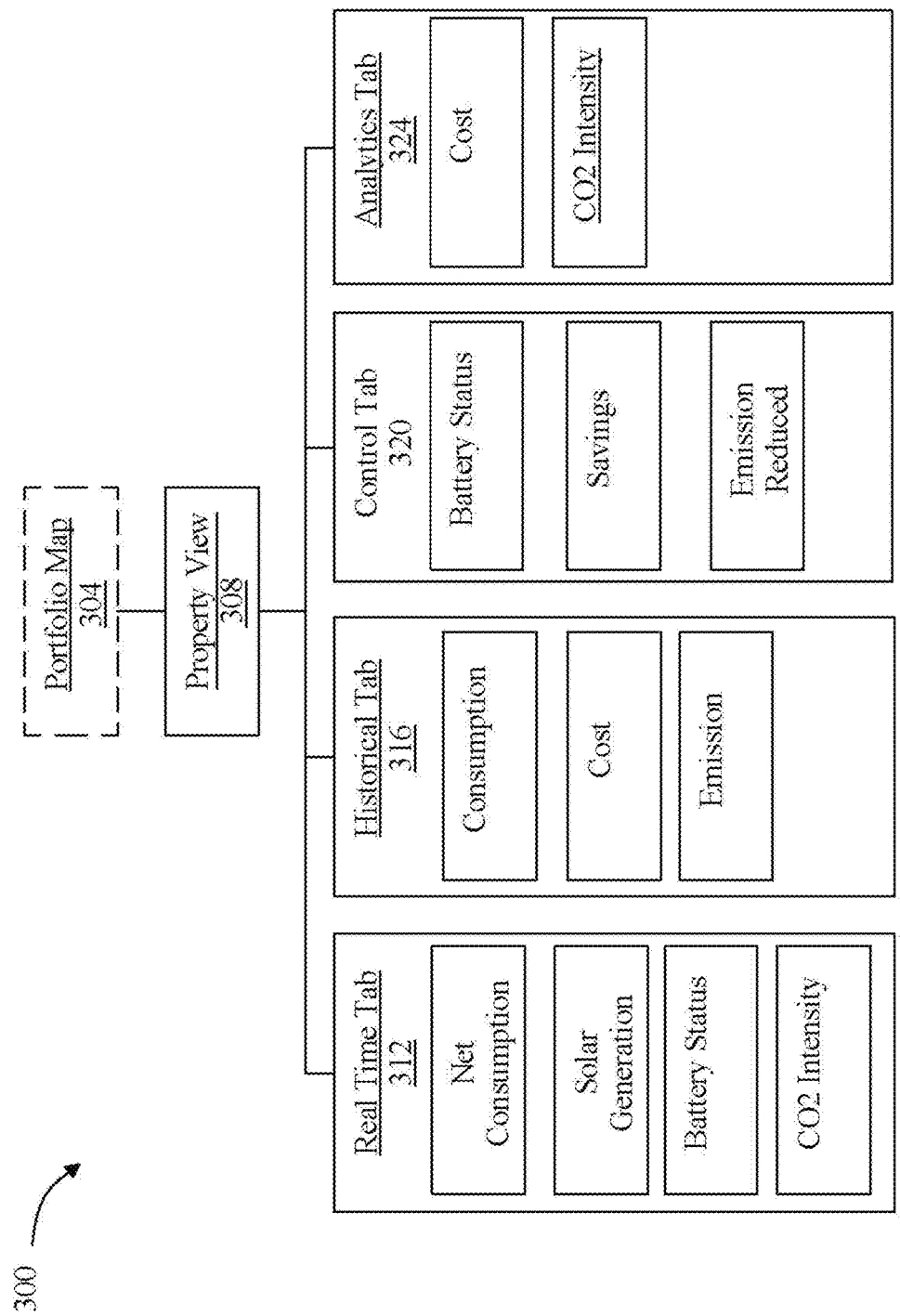
FIG. 3 is a block diagram illustrating an exemplary embodiment of a user interface.

Still referring to FIG. 2, a goal of the proposed platform's user interface may be to leverage real-time data to help the user achieve the dual objectives of saving costs and reducing emissions. FIG. 3 shows an exemplary architecture 300 of an embodiment of a user interface. A portfolio map 304 may be used to view one or more properties if a user has multiple properties on system 100. A property view 308 may be used to illustrate data concerning any power generator, local grid, or other facilities and/or groups thereof a user may be responsible for managing. Each property view may include, without limitation a real time tab 312, which may be used to visualize real-time data, including without limitation real-time energy, carbon, grid, market, and/or weather data; an objective of real time tab may be to show the real-time status of the system, signals, and environment so that the impacts of costs and emissions can be evaluated. Real-time alerts may be triggered upon detection of forecasted significant increase in costs and/or emissions so that either autonomic or manual interventions may take place.

Still referring to FIG. 3, each property view 308 may include, without limitation a historical tab 316, which may show historical data for user to analyze historical consumption, costs, and/or emissions, track the progress against goals, and/or project how metrics will look at a future time. Different ways of visualization, such as monthly, yearly, accumulated, and the like may help user better analyze historical performance and gain insights.

Continuing to refer to FIG. 3, each property view 308 may include, without limitation a control tab 320. This tab may show a current and/or planned control strategy and its impact on costs and emissions. User may be able to compare different strategies and compare their performances using what-if scenarios and visualizations. An objective may be to help user evaluate different intervention strategies and visualize the impacts.

Still referring to FIG. 3, each property view 308 may include, without limitation an analytics tab 324, which may provide more in-depth analytics for user to understand patterns behind data so that they can use such insights to design new strategies or set goals. For example, and without limitation, clustering analysis of monthly peaks may help the user better expect a peak and reduce it. Analysis of temporal patterns of grid carbon intensities may help a user schedule their operations to cleaner periods. Such analysis may be performed using an unsupervised and/or supervised clustering algorithm, such as without limitation a "k-means clustering algorithm" defined as an algorithm for cluster analysis that partitions n observations or unclassified cluster data entries into k clusters in which each observation or unclassified cluster data entry belongs to the cluster with the nearest mean, using, for instance behavioral training set as described above. "Cluster analysis" as used in this disclosure, includes grouping a set of observations or data entries in way that observations or data entries in the same group or cluster are more similar to each other than to those in other groups or clusters, whether performed using k-means clustering or other clustering algorithms. Cluster analysis may be performed by various cluster models that include connectivity models such as hierarchical clustering, centroid models such as k-means, distribution models such as multivariate normal distribution, density models such as density-based spatial clustering of applications with nose (DB-SCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster.

Continuing to refer to FIG. 3, user interface elements may enable a user to visualize carbon intensity using various means to show carbon intensity to the user intuitively. In the real-time tab, carbon intensity may be shown as a color of a line which changes depending on carbon intensity at that specific time. When a mouse cursor or other cursor operated by user hovers over a line, a popup may show data such as a real-time average and/or marginal carbon intensity, for instance and without limitation with detailed breakdown of grid fuel mix and/or marginal fuel types. A binary color scheme (e.g., black or green) or a gradient color scheme (e.g, between black and green) may be used to denote how clean grid power is based on carbon intensity. Either average or marginal carbon intensity may be used as the indicator, depending on context and/or user preferences. A more general indicator combing average and marginal carbon intensities may alternatively or additionally be used. In historical visualization tab, emissions may be broken down into different fuel types, showing sources of consumed energy. Note that in market-based accounting, as described in further detail below, a breakdown may adapt to contracted power. In analytics tab, carbon may be shown in a form of a heat map to reveal its temporal patterns.

Still referring to FIG. 3, data and visualization thereof may be used to aid in sustainability efforts by entities attempting to fight against climate change. An entity's contribution to emissions may conventionally be calculated as total energy consumption (MWh) multiplied by grid carbon intensity (lbs/MWh), where the grid carbon intensity may be calculated as an annual $$\text{average} \frac{\text{total annual emissions of all gereators (lbs)}}{\text{total annual enerty of all generators (MWh)}}$$

by a grid operator. Such a static method may be inadequate to meet increasing demands on corporate sustainability. In particular, i) grid emissions have become much more dynamic due to the dramatic change on the generation side; ii) one annual emission number provides little visibility or insights for actions; iii) companies have limited capability to deal with the result. An underlying assumption of the above method is that the grid carbon intensity does not change over time, which is increasingly inaccurate because of the dramatic change on the generation side. The rise of renewables has brought significant fluctuations to grid carbon. Timing of usage is becoming increasingly important to evaluate emission impacts. Consumption at different times has very different emission impacts. Systems as illustrated in this disclosure may enable users and/or devices to quantify carbon emission savings and to leverage temporal differences in grid emissions for improving sustainability, real-time carbon signals from the grid are necessary to evaluate and optimize the emission impacts of energy resources.

Continuing to refer to FIG. 3, emissions of an entity such as a company may be classified into three scopes. Scope 1 emissions may include direct emissions from on-site sources. Scope 2 emissions may include indirect emissions from the generation of purchased energy from local grids. Scope 3 emissions may include other indirect emissions (not in Scope 2) that occur in a value chain. Systems as described above may aid an entity in predicting and/or managing scope 2 emissions using analysis of power grid emissions. Embodiments of system may use historical emission data from local grid monitoring devices and/or reporting services 136, to drive statistical learning approaches to analyze grid carbon intensity models for estimating and forecasting real-time emissions. This approach may harness mathematical models, such as machine-learning models, of real-time emissions and grid carbon intensities, which may be combined with prior knowledge for real-time optimization and control.

Figure 4:
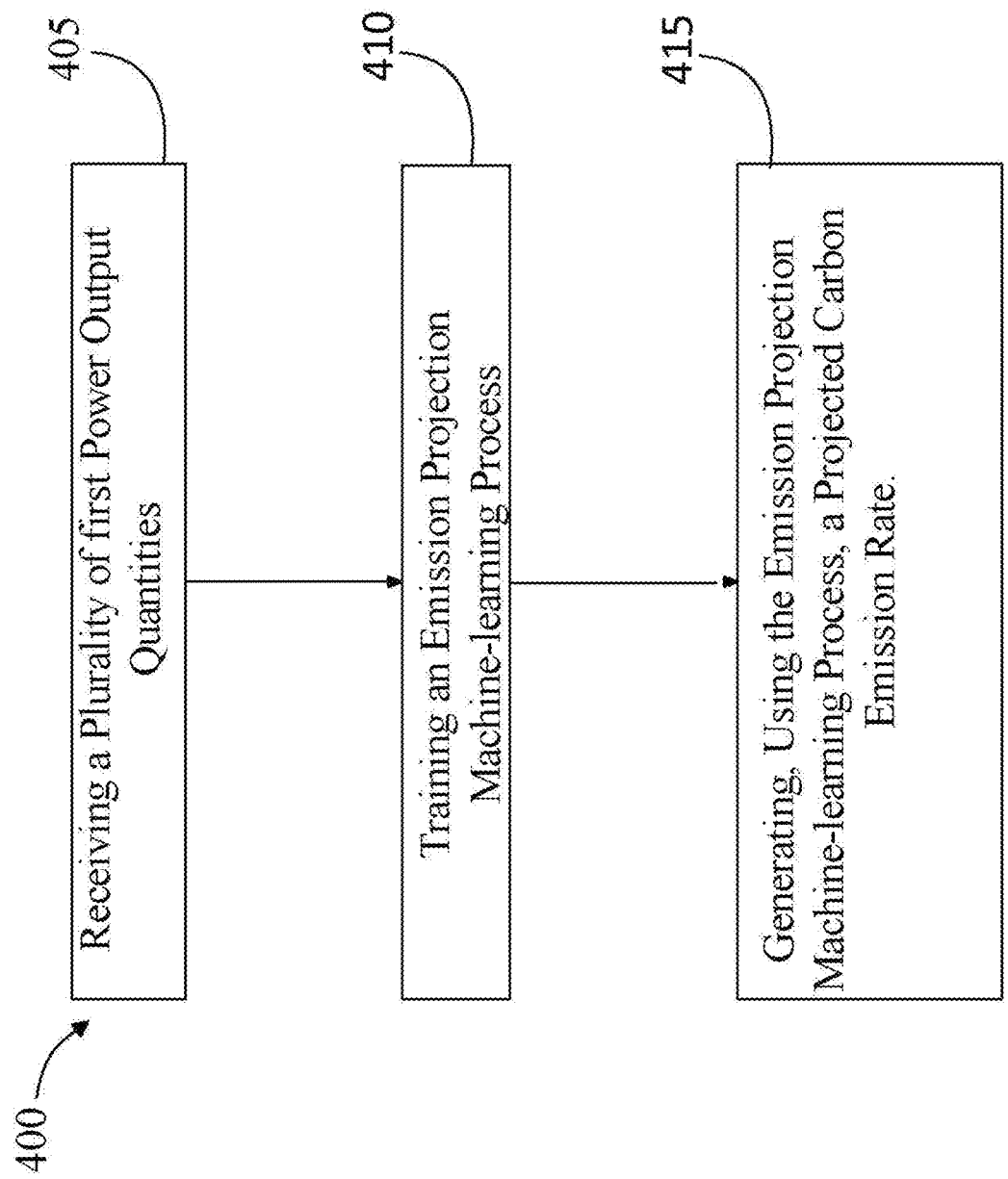
FIG. 4 is a flow diagram illustrating an exemplary embodiment of a method of machine-learning for prediction grid carbon emissions.

Referring now to FIG. 4, an exemplary embodiment of a method 400 of machine-learning for prediction grid carbon emissions is illustrated. At step 405, a computing device 104 receives a plurality of first power output quantities of a plurality of power generators in a first local grid 112 from a first local grid monitoring device 108 monitoring the first local grid 112. First power output quantities may be provided at one or more time resolutions, such as once every minute, once every five minutes, once a day, or the like, for instance as described above. In an embodiment, computing device 104 may perform one or more processes to convert first power output quantities to a regular time resolution; this may have an advantage of permitting direct comparison of values across local power grids and/or other data sources and/or recipients. A common time resolution may include, without limitation, an update every five minutes, or any other suitable time resolution. Computing device 104 may regularize data received at a higher resolution by down sampling to samples captured every five minutes; higher sampling rates may be stored in a datastore for analytical processes; for instance and without limitation, higher-resolution data may be used to training machine-leaning processes with higher-resolution as described in further detail below, which processes may then be generalized for use with data at target resolution by additional training with broader data availability spectra. Alternatively or additionally, computing device 104 may up-sample data received at a lower time resolution than target resolution; up-sampling may interpolate readings in any suitable manner, including without limitation assuming that interpolated readings have identical values to immediately preceding received values, setting such interpolated readings to zero and running the resulting signal through a digital low-pass filter, and/or computing such values using an interpolation function. Interpolation function may be trained using high-resolution data as described above, for instance to generate a linear and/or polynomial interpolation function using linear and/or polynomial regression algorithms as described in further detail below. A typical set of power output quantities may break down by fuel types, such as coal, natural gas, nuclear, hydroelectric, renewables, and/or import from another local grid.

Still referring to FIG. 4, computing device 104 may perform one or more data quality analysis steps, such as without limitation determining a degree of uncertainty in received data, which may be represented as a confidence interval, a degree of potential deviation from a reported value, or the like. Degree of uncertainty may be calculated, without limitation, using historical data; for instance, a given local grid and/or a power generator within the grid may be determined using historical data, results of audits by reporting agencies, or the like to fall within a given range of possible values about a reported value. Alternatively or additionally, degree of uncertainty may be calculated and/or weighted according to time resolution of data, where a greater time resolution may, for instance, be associated with a higher degree of accuracy and thus a lower degree of uncertainty. A degree of uncertainty may be used to compute a degree of uncertainty in machine-learning processes and/or models as described in this disclosure. A degree of uncertainty may be reported to recipient devices and/or entities, for instance using a user interface and/or API.

With continued reference to FIG. 4, receiving first power output quantities may include receiving at least a second power output quantity from a second local grid 120; for instance, first local grid 112 may be connected on a larger regional and/or national grid to second local grid 120, which may either send power to and/or receive power from first local grid 112. Where second local grid 120 is used as a source of power, second local grid 120 may be treated by system 100 as another power generator. A dedicated power generator or set thereof from second local grid 120 may be used, and thus local grid monitoring device may provide power output quantities measuring use of power from such power generators. Alternatively or additionally, entire second local grid 120 may be modeled as a power generator based on values calculated therefor using system 100 or any other available such values. Where first local grid 112 both sends electrical power to and receives electrical power from one or more second local grids 120, system 100 may compute and solve a linear system, using for instance matrix equations based on variables stored as vectors of received values multiplied by matrices of coefficients, to determine carbon intensity of each local grid, given imports from and exports to other local grids. received while subtracting quantities provided to another local grid. Such coefficients may be user entered and/or derived using, without limitation, a machine-learning process trained using historical data, such as a regression algorithm as described in further detail below. In an embodiment, a carbon intensity of second local grid 120 may be calculated using any method described in this disclosure, and/or received from a second local grid monitoring device 116 or other remote device; alternatively or additionally, a static carbon intensity may be used, where higher-resolution and/or real time data concerning second local grid 120 is unavailable. As an illustrative, non-limiting example, where first local grid 112 generates 10 MWh of power with a carbon intensity of 2 tons/MWh, and second local grid 120 generates 15 MWh of power with a carbon intensity of 3 tons/MWh, if there's no power exchange between first local grid 112 and second local grid 120, then their production-based and consumption-based carbon intensity may be the same: first local grid 112 at 2 tons/MWh, second local grid 120 at 3 tons/MWh. If first local grid 112 now imports 10 MWh power from second local grid 120, then total emissions of first local grid 112 due to consumption would now become 10 MWh (local production)*2 tons/MWh (production-based carbon intensity)+10 MWh (import)*3 tons/MWh (production-based carbon intensity from the imported grid)=50 tons. As a result, from a consumption perspective, the carbon emissions of consuming 1 MWh in first local grid 112 would be 50 tons/20 MWh=2.5 tons/MWh. Where there is a network of grids with many power exchanges between them, a linear system as described above may be solved to compute consumption-based carbon intensities of each region using production-based carbon intensities, local power productions, and imports and exports among the regions. In an embodiment, linear system may have a form of $Ax=b$, where x is a vector of consumption-based carbon intensities of each region to be solved; A is a matrix generated as a function of the local power productions in different regions and the power imports and exports between them; and b is a vector of total emissions production in each region, each element of which may be calculated as local power production*production-based carbon intensity. Each value of x may be calculated according to any method described in this disclosure for calculation and/or forecast of consumption-based carbon intensities, for instance as described in further detail below, including without limitation machine learning. In an embodiment, matrix values may be updated using numbers as reported, for instance by local grid monitoring devices or the like; matrix values may be updated as frequently as energy import and/or export values are updated, or in other words may fluctuate in real time. Alternatively or additionally, matrix values may be estimated and/or forecast using statistical methods such as averaging and/or machine-learning processes such as regression machine-learning processes, which may be trained using data associating any temporal data, power output quantities, and/or extrinsic data as described herein as inputs and matrix cell values as outputs.

At step 410, and still referring to FIG. 4, computing device 104 trains an emission projection machine-learning process. Training may include compiling a plurality of training data entries, each training data entry correlating a plurality of past power output quantities with at least a reported carbon emission datum, for instance as described above. Correlation may include direct correlation and/or computation of current carbon intensity for a set of power output quantities at a given time, for instance as described in further detail below, which may be correlated to emission data, as well as, without limitation, one or more additional and/or exogenous elements of data such as weather data, time of day, other circumstantial things, day of week, market, holiday, and/or season data.

Still referring to FIG. 4, computing device 104 trains emission projection machine-learning process using the plurality of training data entries. Training may be accomplished using one or more machine-learning algorithms as defined above. Machine-learning algorithms may include, without limitation, supervised machine-learning algorithms. Supervised machine learning algorithms, as defined in this disclosure, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs described in this disclosure as inputs, including without limitation power output quantities as described above, as well as various alternative or additional exogenous signals such as time, weather, system demand, market conditions, or the like, outputs such as projected carbon emission rates for instance including both average and marginal carbon intensities, current rate of change of carbon emission rates, current carbon emission rates, and/or projected rates of change of carbon emission rates, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data. Persons skilled in the art, upon reviewing the entirety of this disclosure, will be aware of various possible variations of supervised machine learning algorithms that may be used to determine relation between inputs and outputs.

Continuing to refer to FIG. 4, computing device 104 may be designed and configured to create a machine-learning model using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Still referring to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

With continued reference to FIG. 4, models may be generated using alternative or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using training data. Processes for deep learning may include, without limitation, use of a long short-term memory (LSTM) recurrent neural network (RNN). LSTM, as used herein, is a neural net learning algorithm that can learn both long-term and short-term temporal connections through a deep neural network.

At step 415, and continuing to refer to FIG. 4, computing device 104 generates, using the emission projection machine-learning process, a projected carbon emission rate as a function of the plurality of power output quantities; this may further be performed based on one or more additional signals and/or data as described in this disclosure, such as weather data, time of day, other circumstantial things, day of week, market, holiday, and/or season data. Using calculated grid carbon intensity models, a time series of carbon intensities denoted by {l(t)} may be derived. Computing device 104 may predict I(t) for different horizons, such as without limitation fifteen minutes ahead, one hour ahead, one day ahead or the like. Generation may include generation as a function of at least a second power output quantity received from at least a second power grid monitoring device, as described above.

Still referring to FIG. 4, computing device 104 may determine a current carbon emission rate as a function of the plurality of power output quantities. Current carbon emission rate may include, without limitation, a production-based current emission rate and/or a consumption-based current emission rate, as described above. This determination may be performed without limitation using location-based, market-based methods. A location-based method may consider average carbon intensity of power grids that provide electricity. A market-based method may consider contractual arrangements under which an organization procures power from specific sources, such as renewable energy. Both the location-based and market-based methods may be used for inventory accounting. Organizations may report their emissions using both methods.

Still referring to FIG. 4, in location-based method, utilizing a real-time grid carbon intensity $l_a(t)$ defined as a real-time average carbon intensity of the grid at t, computing device 104 may calculate a user's real-time emissions due to the consumption of electricity consumed as:

$$C_f(t)=p(t)*l_a(t)*\Delta t,$$

where p(t) is the user's net power demand (excluding onsite renewables) from a grid in kW and $\Delta t$ is the time interval.

Still referring to FIG. 4, in a market-based method, a user may purchase some of their power via power purchasing agreements (PPA) typically in the form of green energy such as solar and wind. Green power generated by contracted generation may be credited to user, for instance and without limitation in the form of renewable energy certificates (RECs). Let $q_i(t)$ be the power that is purchased from green contract i. If user's consumption p(t) is more than the total contracted power generation $\Sigma_i q_i(t)$, the residual $p(t)-\Sigma_i(t)$ is the power from the grid. The user's real-time emission impact is then calculated based on the residual power from the grid:

$$c_k(t) = \max\left(\left(p(t) - \sum_i q_i(t)\right), 0\right) l_a(t)\Delta t$$

The emission impact is zero if the user's consumption is equal to or less than the contracted green power generation.

Still referring to FIG. 4, in above methods, real-time power consumption data may be obtained using a smart meter; real-time power consumption data may be used to derive consumption-based carbon tonnage and/or emission impact of power consumption as measured by smart meter by multiplying real-time power consumption by real-time carbon intensity. Depending on first grid monitoring device, real-time grid carbon intensities may or may not be available directly. For example, California ISO started releasing real-time emission data since January 2018. However, not every ISO provides ready-to-use real-time carbon intensity data. If real-time carbon intensity data is not directly available from the ISO, computing device 104 may learn real-time carbon intensity data using available real-time grid data. Alternatively or additionally, computing device 104 may receive real-time average and marginal carbon intensities from a third-party service and/or device.

Still referring to FIG. 4, based on generation fuel mix, computing device 104 may estimate real-time average grid carbon intensity, which may be production-based carbon intensity, as:

$$l_a(t) = \frac{\Sigma_i I_i * g_i(t)}{\Sigma_i g_i(t)}$$

where $g_i(t)$ is power generation of fuel type i and $I_i$ is average carbon intensity of the particular fuel type, which may be obtained based on historical emission reports such as the EPA eGRID. Note that intensity of an import sometimes is difficult to get. An average intensity of imported power may be used if real-time data is not available.

Still referring to FIG. 4, where first local grid monitoring device 108 reports power output quantities in real time, computing device may use such power output quantities to calculate carbon intensity as described herein. Where first local grid monitoring device 108 does not report power output quantities in real time, computing device 104 may use a machine-learning process to calculate real-time power output quantities. For instance, and without limitation, training data as described above may be generated associating real-time power output quantities of one or more other local grids with temporal values and/or fuel types present in first local grid 112; any supervised machine-learning algorithm may then be generated that outputs real-time power output quantities by fuel type using non-real time power output quantities from first grid monitoring device 108 and/or one or more temporal data as inputs.

Computing device may calculate emission factors of each fuel type using historical data from reporting services 136 that reports yearly power plant-level emissions, net generation, and fuel type. Computing device may then use total carbon emissions (in tons) emitted by the power plants of the same fuel type divided by the total net generation (in MWh) of the power plant. Uncertainties in the emission factors of each fuel type in each region may then be calculated. Thus, for estimation of real-time carbon intensities, real-time power generation data may be certain, while emission factor of a fuel type may be uncertain because only the fuel type is known, not which power plants are producing the power at that time. This uncertainty may be reported using client interface 152.

Figure 5:
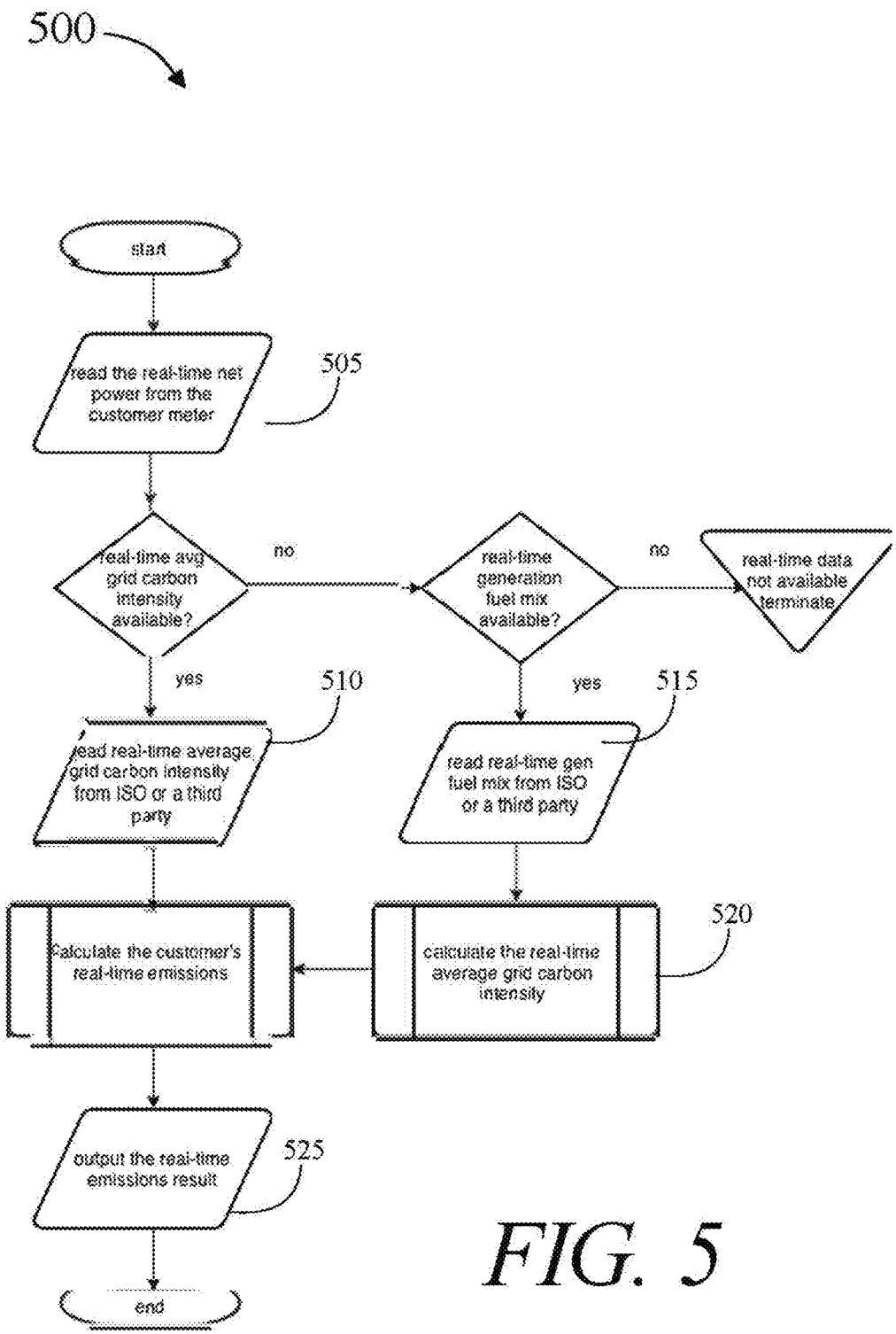
FIG. 5 is a flow diagram illustrating an exemplary embodiment of a method of calculating carbon intensity.

Referring now to FIG. 5, a flow diagram 500 illustrates an exemplary process flow for determining a user's real-time emission impact using a location-based accounting method. At step 505, computing device 104 may read real-time net power from a customer meter. If real-time average carbon intensity is available from a local grid monitoring device and/or third-party device, at step 510, computing device 104 may read real-time average grid carbon intensity. If not, computing device 104 may read real-time generator fuel mix from a local grid monitoring device and/or third-party device, at step 515, and calculate real-time average grid carbon intensity, for instance using any process described above, at step 520. At step 525, computing device 104 may calculate customer's real time emissions, for instance using any process as described above; at step 530, computing device 104 may output real-time emission results.

Figure 6:
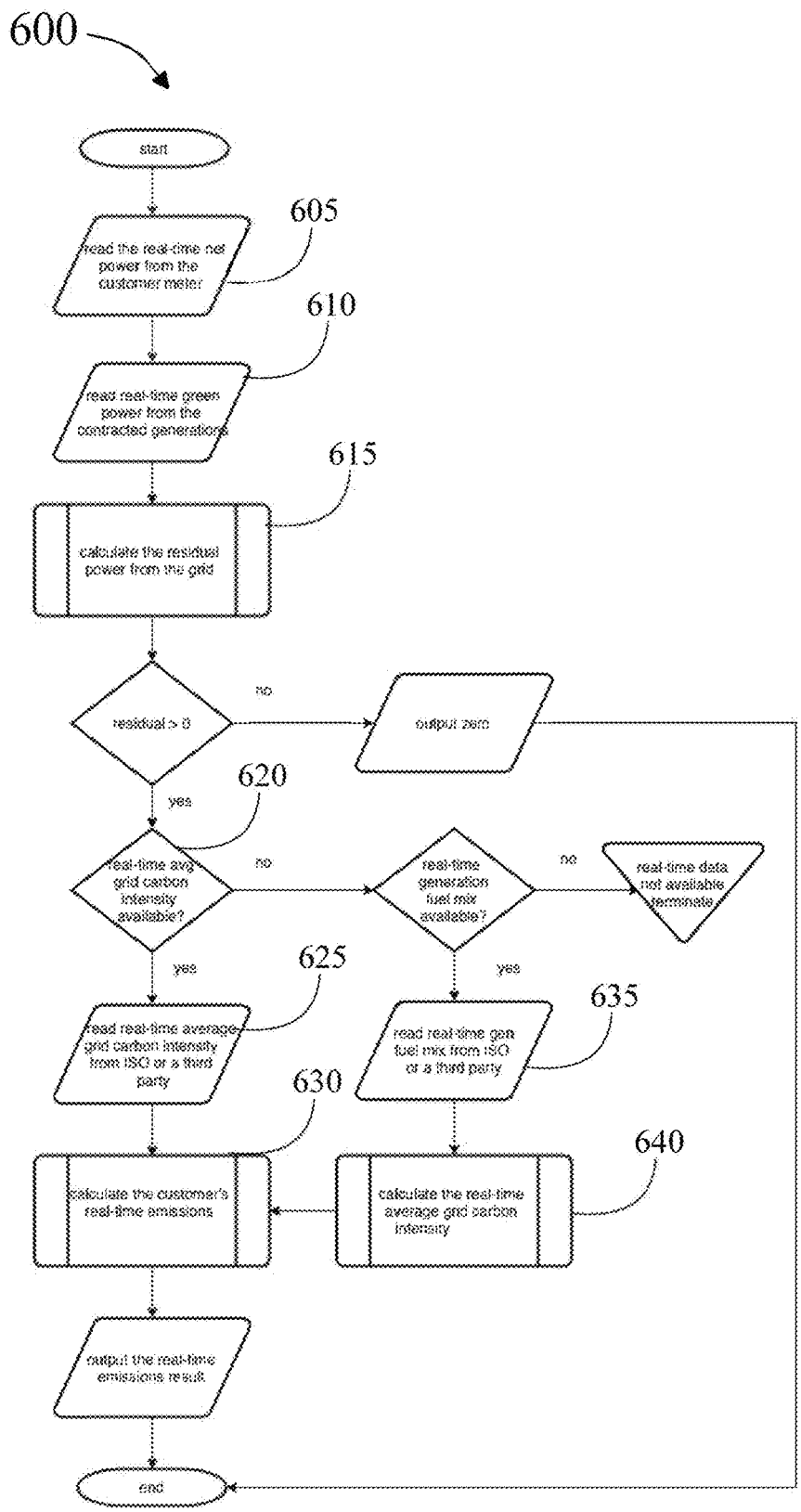
FIG. 6 is a flow diagram illustrating an exemplary embodiment of a method of calculating carbon intensity.

Referring now to FIG. 6 a flow diagram 600 illustrates an exemplary process flow for determining a user's real-time emission impact using a market-based accounting method. At step 605, computing device 104 may read real-time net power from a customer meter. At step 610, computing device 104 may read real-time green power from contracting generators. At step 615, computing device 104 may calculate residual power from grid, for instance using any process as described above. If residual is greater than zero, computing device 104 may evaluate at step 620 whether real-time average grid carbon intensity is available from a local grid monitoring device and/or third-party device; if yes, computing device 104 may receive real-time average grid carbon intensity at step 625, and may calculate, at step 630, a customer's real-time emissions, for instance using any process as described above. If real-time average grid carbon intensity is not available but real-time generation fuel mix is available, computing device 104 may receive real-time generation fuel mix at step 635, calculate real-time average gird carbon intensity at step 640, for instance using any process as described above, and then proceed to step 630.

Referring again to FIG. 4, computing device 104 may determine a current marginal carbon intensity. A marginal method may consider the carbon intensity of marginal power plants that responds to a change in demand; this may typically be used to evaluate an emission impact of policy and technology interventions, such as electric vehicle tax credits and/or energy storage. Marginal accounting may be used, as noted above, to calculate avoided emissions. Marginal method may also be used, without limitation, for consequential accounting. Current and/or projected carbon intensity, rates of change of carbon intensity, current and/or projected marginal carbon intensity, past or projected carbon tonnage, past or projected avoided carbon tonnage, and/or costs may be calculated for all of first local grid 112, for individual power generators and/or utilities, and/or for a particular consumer of power from local grid.

In an embodiment, and still referring to FIG. 4, first local grid monitoring device 108 may report real-time marginal fuel power output quantities; alternatively, where first local grid monitoring device 108 does not report marginal power output quantities in real time, computing device 104 may use a machine-learning process to calculate real-time marginal power output quantities. For instance, and without limitation, training data as described above may be generated associating real-time marginal power output quantities of one or more other local grids with temporal values and/or marginal fuel types present in first local grid 112; any supervised machine-learning algorithm may then be generated that outputs real-time marginal power output quantities by fuel type using non-real time marginal power output quantities from first grid monitoring device 108 and/or one or more temporal data as inputs.

With continued reference to FIG. 4, in a marginal method, $l_m(t)$ may refer to a carbon intensity of marginal power plants that respond to a change in demand at t; such marginal plants may include plants having readily variable outputs, such as natural gas power plants, coal power plants, oil power plants, wind, or the like. Real-time emission impact of an intervention by a user, such as reduction in power consumption as compared to a baseline, may be estimated by:

$$C_m(t) = p_m(t) * l_m(t) * \Delta t,$$

where $p_m(t)$ refers to the power of the user's energy resource used in the intervention such as without limitation energy storage, demand response, or the like. This is method may be used to quantify the emission consequences of an intervention made by a user. A result may be expressed as avoided emissions as compared with a baseline, where the baseline may represent previous consumption-based emissions of a user and/or entity consuming power from first local grid 112. If marginal power plant or fuel type is known, marginal carbon intensity may be estimated using carbon intensity of the marginal plant or fuel type. If there are multiple marginal units or fuel types, marginal carbon intensity may be estimated by an average of the carbon intensities of the marginal units or fuel types. Mathematically, this may be expressed as:

$$l_m(t) = \frac{\Sigma_i I_i}{\Sigma_i 1}$$

where i refers to the marginal units or fuel types at time t and $I_i$ is the carbon intensity of the marginal unit i or marginal fuel type i.

If the marginal plant or fuel type information is not available, marginal carbon intensity may be estimated as a rate of change in total system emissions with respect to the change in total system demand:

$$l_m(t) = \frac{|\Sigma_i I_i * g_i(t) - \Sigma_i I_i * g_i(t-1)|}{|\Sigma_i g_i(t) - \Sigma_i g_i(t-1)|}$$

where the numerator is the change of total emissions and the denominator is the change of total demand. For some applications, knowing marginal fuel type is enough. A fuel type may be inferred from fuel mix as marginal if $g_i(t) \neq g_i(t-1)$. Also, marginal fuel type data from first grid monitoring device 108 may be transformed into marginal emission rate data using reports from reporting services 136.

Still referring to FIG. 4, generating the projected carbon emission rate may include generating a determining a projected marginal carbon emission rate. In an embodiment, this may be performed by generating a projected current marginal carbon emission rate machine-learning process and/or model; computing device 104 may train projected marginal carbon emission rate machine-learning process and/or model using training data and machine-learning algorithms as described above. Inputs to projected marginal carbon emission rate machine-learning process and/or model may include, without limitation, any input suitable for emission projection machine-learning process; inputs may alternatively or additionally include a current and/or projected carbon intensity.

Figure 7:
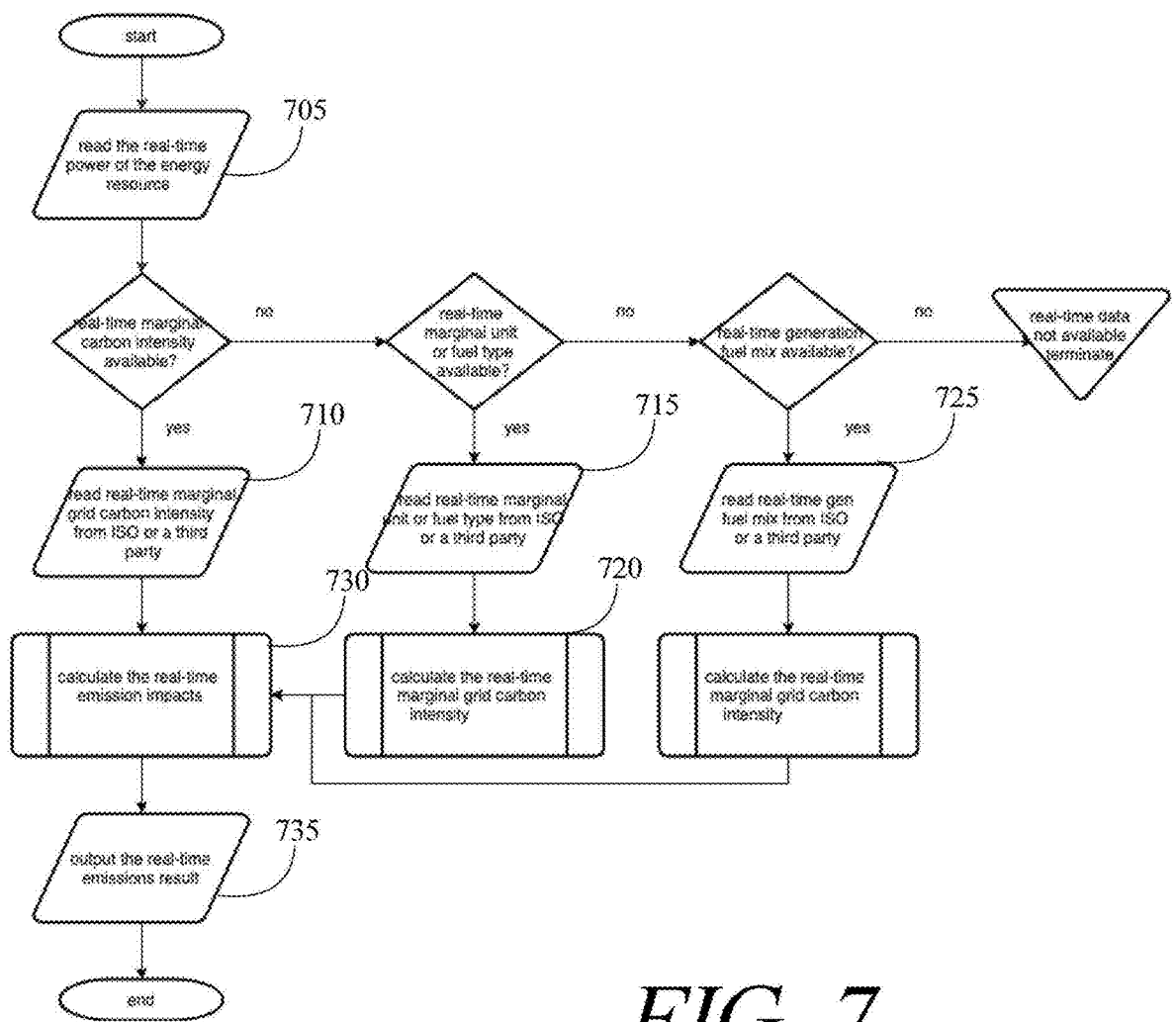
FIG. 7 is a flow diagram illustrating an exemplary embodiment of a method of calculating carbon intensity.
Figure 8:
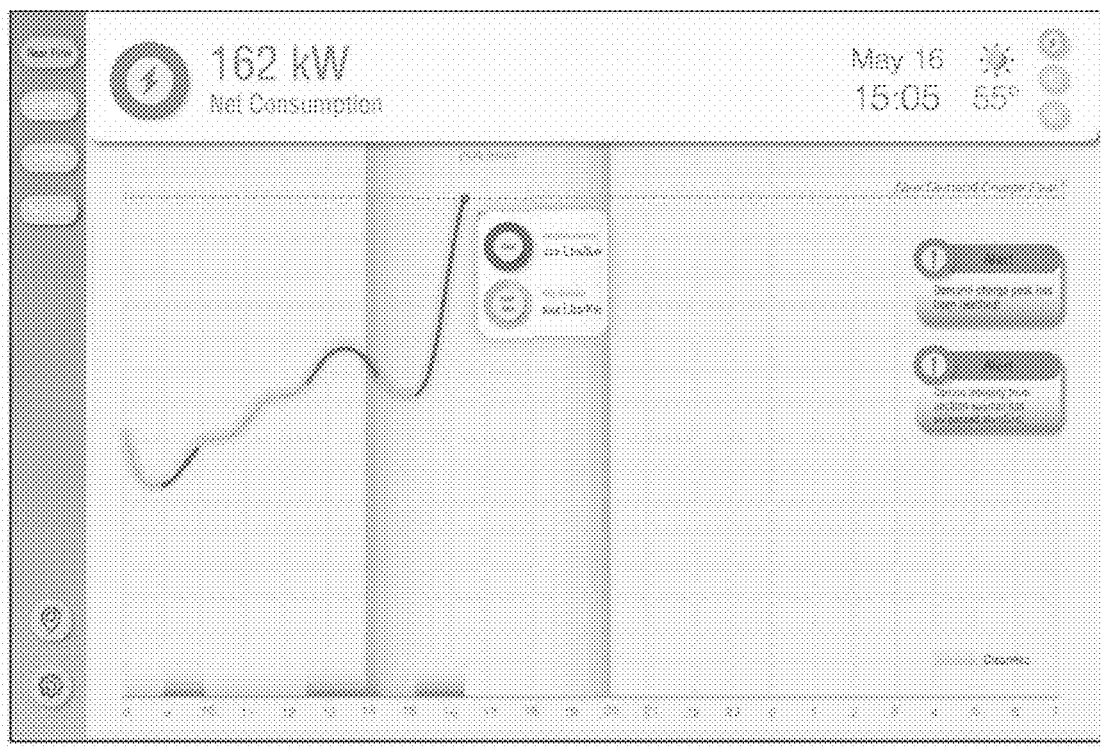
FIGS. 8-11 are screenshots showing exemplary embodiments of a user interface.
Figure 9:
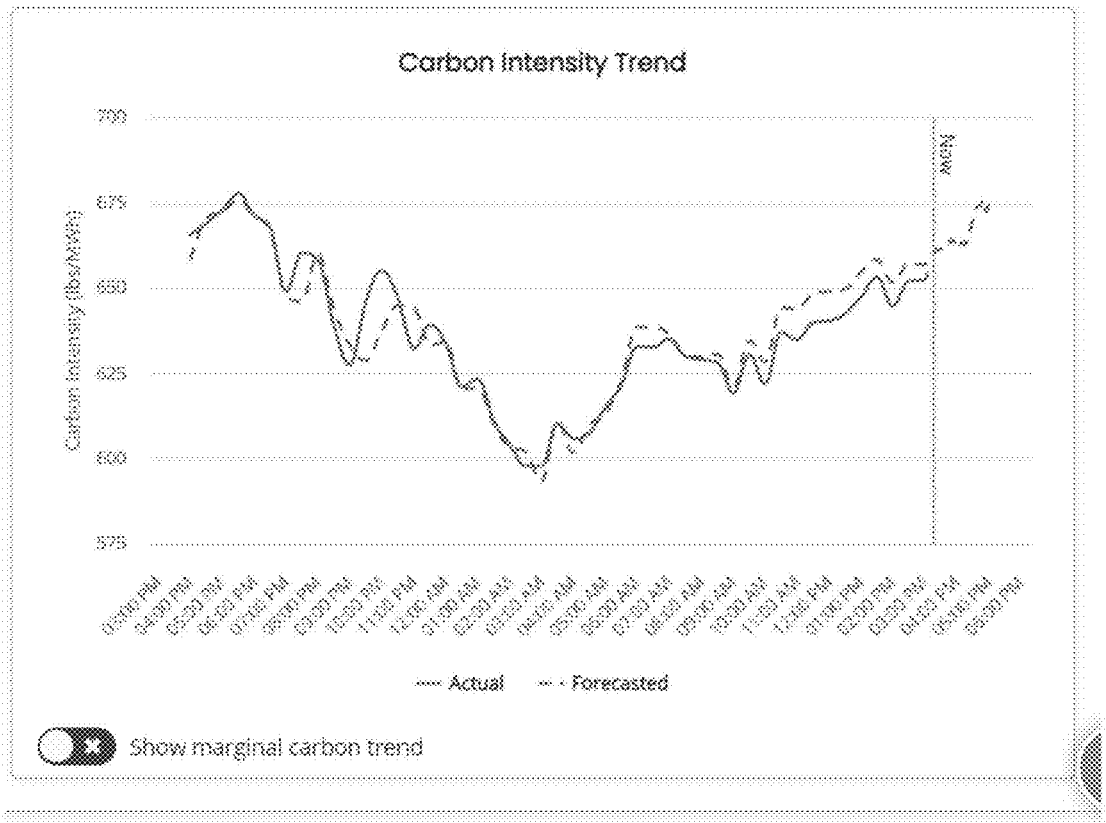
Figure 10:
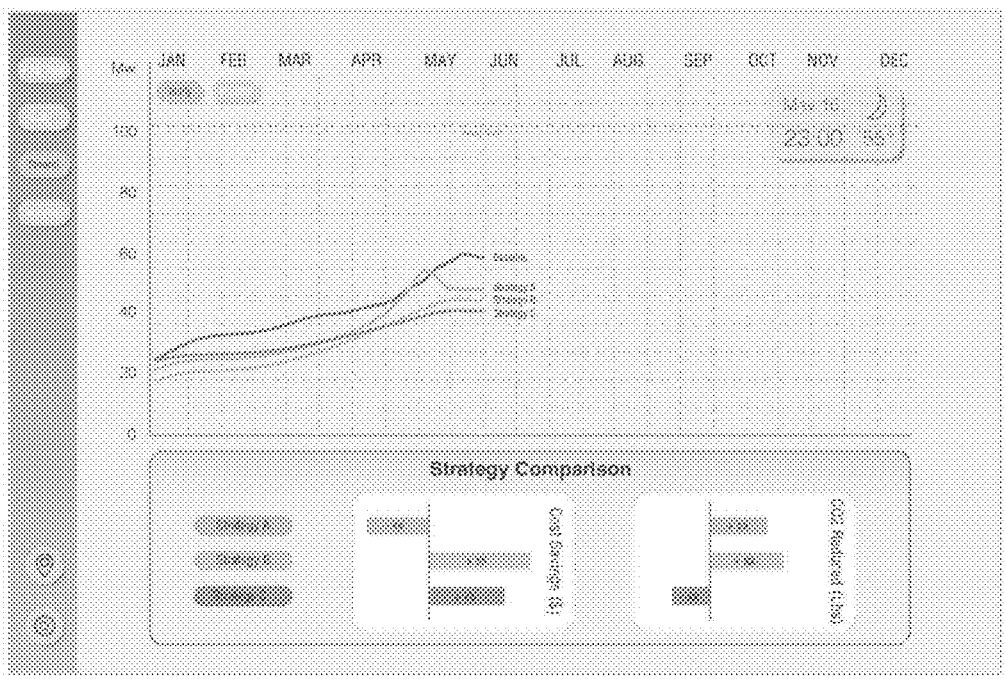
Figure 11:
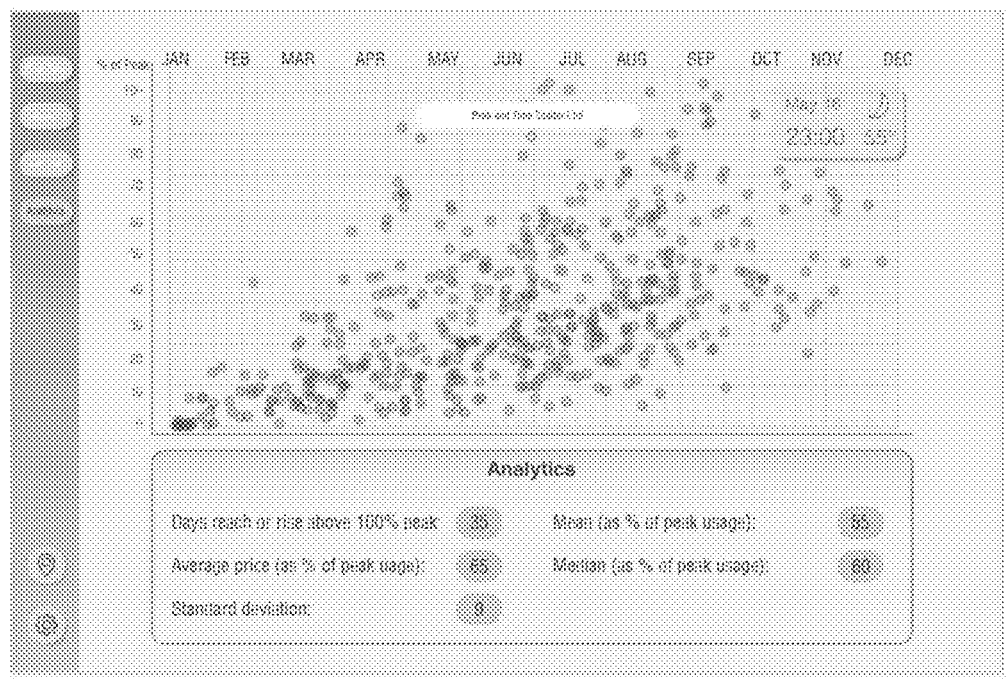

Referring now to FIG. 7 a flow diagram 700 illustrates an exemplary process flow for determining a user's real-time emission impact using a marginal accounting method. At step 705, computing device 104 may read real-time power of an energy resource. If real-time marginal carbon intensity is available from a grid monitoring device and/or third party, at step 710 computing device 104 may read and/or real-time marginal grid carbon intensity. If not, computing device 104 may evaluate whether real-time marginal unit and/or fuel type data is available; if so, computing device 104 may read real-time marginal unit and/or fuel type data at step 715 and calculate real-time marginal grid carbon intensity at step 720; calculation may be performed using any process described above. If not, at step 725, computing device 104 may read real-time generator fuel mix from a grid monitoring device and/or third party, before calculating real-time marginal grid carbon intensity, where calculation may be performed using any process described above. At step 730, regardless of provenance of real-time marginal grid carbon intensity, computing device 104 may calculate marginal emission impacts, using any process as described above, which computing device 104 may output at step 735.

Referring again to FIG. 4, computing device 104 may determine a current rate of change of carbon emission rate. In an embodiment, this may be performed by generating a current rate of change machine-learning process and/or model; computing device 104 may train current rate of change machine-learning process and/or model using training data and machine-learning algorithms as described above. Inputs to current rate of change machine-learning process and/or model may include, without limitation, any input suitable for emission projection machine-learning process; inputs may alternatively or additionally include a current and/or projected carbon intensity.

Still referring to FIG. 4, determining a projected rate of change of carbon emission rate. In an embodiment, this may be performed by generating a projected current rate of change machine-learning process and/or model; computing device 104 may train projected rate of change machine-learning process and/or model using training data and machine-learning algorithms as described above. Inputs to projected rate of change machine-learning process and/or model may include, without limitation, any input suitable for emission projection machine-learning process; inputs may alternatively or additionally include a current and/or projected carbon intensity.

In an embodiment, and with continued reference to FIG. 4, computing device 104 may determine past carbon tonnage produced as a function of the plurality of first power output quantities. Past carbon tonnage may include without limitation past carbon tonnage produced by local grid and/or a consumer's indirect carbon tonnage due to the consumption of electricity, calculated by consumption times grid carbon intensity at each time interval and then summing up and/or aggregating results. This may be performed, without limitation, by retrieving set of past values over a time period in question and integrating and/or summing over past values to generate an aggregate result. Computing device may alternatively or additionally calculate avoided carbon tonnage by aggregating reductions in power consumption as multiplied by marginal carbon intensity. Calculation may be performed, without limitation at each time interval in a subject time period identified by a user command and/or automated process, and then summed and/or otherwise aggregated over the subject time period.

In an embodiment, and still referring to FIG. 4, computing device 104 may determine a projected future carbon tonnage as a function of the projected future carbon emission rate. Projected carbon tonnage may include without limitation projected carbon tonnage produced by local grid and/or a consumer's projected indirect carbon tonnage due to the consumption of electricity, calculated by the projected future consumption times the projected future carbon emission rate at each time interval and then summing up and/or aggregating results. This may be performed, without limitation, by retrieving set of past values over a time period in question and integrating and/or summing over past values to generate an aggregate result. Computing device may alternatively or additionally calculate projected avoided carbon tonnage by aggregating projected reductions in power consumption as multiplied by the projected future marginal carbon intensity. Calculation may be performed, without limitation at each time interval in a subject time period identified by a user command and/or automated process, and then summed and/or otherwise aggregated over the subject time period.

Still referring to FIG. 4, computing device 104 may generate one or more power output recommendations for a local grid operator, power-consuming entity, or the like. Such recommendations may aid such users in handling intrinsic uncertainty and randomness of an ambient environment. Real-time decisions may include deciding control actions for different types of energy resources. Objectives of such recommendation processes may include minimizing emissions while maximizing economic benefits. In an embodiment, computing device 104 a power output recommendation minimizing carbon output. This may be accomplished, without limitation, by using machine-learning models and/or calculations as described above to determine likely carbon intensity resulting from various power consumption choices; possible selections of power source and/or proportions of power generated thereby may be used as variables in a mathematical expression such as a loss function as described in further detail below. Such mathematical expression may be iteratively modified to minimize a carbon intensity output.

Still referring to FIG. 4, computing device 104 may generate a power output recommendation minimizing a function of carbon output and cost. This approach may offer a singular advantage over existing resource optimization and control strategies, which only respond to the price signals with an objective of reducing energy costs. It has been demonstrated that existing energy management strategies such as energy storage, load shifting, and the like could lead to an increase of carbon emissions by up to 70% owing to an increasingly complex and variable power-generation infrastructure. Millions of energy resources are currently managed in absence of real-time carbon signals, failing to meet increasing demands on sustainability and goals of a smart grid. More accurate and efficient resource utilization may be realized by using real-time carbon emission data, and by co-optimizing cost and carbon intensity.

In an embodiment, and further referring to FIG. 4, a control problem for co-optimization may be characterized mathematically for illustrative purposes as follows: a user may have N controllable energy resources such as energy storage, electric vehicle (EV), diesel generation, fuel cells, flexible loads, and the like to be controlled over T time steps. User may have a base load b(t) that is uncontrollable at time t. Note that uncontrollable renewables such as solar and wind may be included in base load. Each resource i's power may be denoted by $p_i(t)$, which is the decision variable. $p_i(t)$ is positive when resource i consumes power and negative when it generates power. $p_i(t)$ is constrained by resource i's model, denoted by $p_i(t) \in P_i(t)$. Let $p_i := (p_i(t), t \in [1, \ldots, T])$, where $[1, \ldots, T]$ denotes a range of times over which the model is being evaluated. There may be a cost associated with each energy resource's actions denoted by $C_i(p_i)$. User's net load may be denoted by $s(t) := b(t) + \Sigma_i p_i(t)$. Lets $s := (s(t), t \in [1, \ldots, T])$. A retail cost may be calculated according to a utility's price model u denoted by $C_u(s, \rho_u)$, where each $\rho_u$ is a price signal, of one or more price signals and/or a plurality of price signals, in a pricing scheme, such as time-of-use, peak pricing, demand charge, or the like. Let $T_s$ denote a time interval of a grid service s. Let $p_s := (\Sigma_i p_i(t), t \in T_s)$. A grid service revenue is based on how well a grid signal, such as a demand reduction signal and/or a frequency regulation signal is followed. Grid service revenue may be denoted for the purposes of this disclosure as $R_s(p_s, g_s)$, where $g_s$ is the grid signal to follow. Let $l := (l(t), t \in [1, \ldots, T])$. Total carbon emissions may be denoted as $C_e(s, l)$.

Still referring to FIG. 4, an energy resource control problem may be formulated as an optimization problem which may be characterized, in a non-limiting example, as follows:

$$\min_{\{p_i\}} [\Sigma_u C_u(s, \rho_u) + \eta_c \Sigma_i C_i(p_i) - \eta_r \Sigma_s R_s(p_s, g_s) + \eta_e C_e(s, l)]$$

$$\text{s.t. } p_i(t) \in P_i(t), \forall i, \forall t$$

where $\eta_c$, $\eta_r$, and $\eta_e$ are coefficients to trade off among the objectives, which may be determined based on the user's preference. Objectives may include 1) minimization of retail energy costs; 2) minimization of energy resource costs; 3) maximization grid service revenues; and/or 4) minimization of carbon emissions. Solving the above problem may produce optimal schedules $p_i$ for each energy resource i.

In an embodiment, and still referring to FIG. 4, both real-time and forecasted signals may be sent to optimization engine. The outputs of optimization engine may include dispatches sent to control energy resources. Future input signals such as price signals, grid service signals, and grid carbon intensities may be input; for instance, each such signal may be generated using processes described above. A forecast model for a base load may be customer's load, which may be calculated, without limitation, by aggregating past consumption-based energy consumption and/or emissions, including without limitation according to any method described herein. Alternatively or additionally, a machine-learning process as described above may be trained using training entries 132 as described above, with training data and/or inputs correlating past consumer loads to other data such as weather data, time of day, other circumstantial things, day of week, market, holiday, and/or season data, and/or any other grid-related and/or extrinsic datum as described above. A load for user may be forecasted using a machine-learning process equipped to account for extensive volatility that may be expected in an individual, institutional-level, and/or building level load. Machine-learning process may include a deep-learning and/or deep neural net approach such as without limitation a long short-term memory (LSTM) recurrent neural network (RNN). LSTM, as used herein is a neural net learning algorithm that can learn both long-term and short-term temporal connections through a deep neural network. In an embodiment, computing device 104 may generate forecasts for a plurality of prediction horizons are sometimes; for example, a demand charge is based on a peak demand of each month, so monthly prediction may be necessary.

Still referring to FIG. 4, optimization may be performed using any optimization algorithm, including without limitation iteratively evaluating a mathematical expression to be minimized across a range of controllable variables, and comparing output values for each time in the one or more time ranges [1, . . . , T] to determine an overall minimal output. Optimization may alternatively or additionally be treated as evaluation of a loss function, where a "loss function" is an expression an output of which an optimization algorithm minimizes to generate an optimal result. As a non-limiting example, computing device 104 may input variable values that are adjustable for an instant user and calculate a size, according to a given definition of "size," of an output and/or set of outputs representing each value to be minimized, such as one or more representations of cost, one or more representations of carbon intensity, and/or an output of a mathematical expression combining cost and carbon intensity. Selection of different loss functions may result in identification of different variable values as generating minimal outputs.

Still referring to FIG. 4, as a non-limiting example of optimization of an energy storage unit, let $\bar{p}$ and $-\underline{p}$ be maximum charging/discharging power, respectively, $E(t)$ be energy stored in energy storage facilities at time t, $\bar{E}$ and $\underline{E}$ be the upper and lower bounds on the stored energy respectively, and $\eta$ be the charging/discharging efficiency. An energy storage unit may be modeled as:

$$\underline{p} \leq p(t) \leq \bar{p}, \forall t,$$

$$E(t) = E(t-1) + \eta(t)p(t), 1 < t \leq T,$$

$$\underline{E} \leq E(t) \leq \bar{E}, \forall t$$

Where $\eta(t)$ is defined as:

$$\eta(t) = \begin{cases} \eta, & \text{if } p(f) > 0 \\ 1/\eta, & \text{otherwise} \end{cases}$$

Any suitable cost model may be employed, including without limitation a linear cost model for the energy storage unit to estimate the degradation cost as $\alpha |p(t)| \Delta t$, where $\alpha$ is the degradation rate, for instance dollars or other units of currency or value per kilowatt-hour, which may be estimated by cost and parameters of an instant unit. Electricity cost of a building may include two parts: an energy charge that is based on total energy consumption and a demand charge that is based on the highest 15-min peak demand during a month. Where energy charge has a flat rate, as may be the case in some local grids, only the demand charge may be considered; horizon of problem T may be set to a month and a time interval $\Delta t$ may be set to 15 minutes. A demand charge may be calculated as $\rho_u \max_t s(t)$, where $\rho_u$ is the demand charge rate, for instance in dollars per kilowatt. $l_m(t)$ is the marginal grid carbon intensity.

In an embodiment, and still referring to FIG. 4, objectives of optimization may be to 1) minimize demand charge; 2) minimize battery degradation cost; 3) minimize marginal carbon emissions due to energy storage. A control problem may be formulated as:

$$\min_{\{p_i\}} \left[ \rho_u \max_t s(t) + \eta_c \Sigma_t \alpha |p(t)| \Delta t + \eta_e \Sigma_t p(t) l_m(t) \right]$$

s.t. constraints are met

Where constraints to be met may include constraint to any equation as described above, including without limitation:

$$\underline{p} \leq p(t) \leq \bar{p}, \forall t,$$

$$E(t) = E(t-1) + \eta(t)p(t), 1 < t \leq T,$$

$$\underline{E} \leq E(t) \leq \bar{E}, \forall t, \text{ and}$$

$$\eta(t) = \begin{cases} \eta, & \text{if } p(f) > 0 \\ 1/\eta, & \text{otherwise} \end{cases}$$

as further described and elucidated above. Control problem may then be minimized using any process as described above.

In a practical example, a control problem as described above was simulated using 2017 real data to compare the results of three strategies: 1) minimization of demand charge only; 2) minimization of carbon emissions only; and 3) co-optimization of demand charge with carbon emissions. Results indicated that minimizing demand charge alone would lead to a cost savings of $102.53 thousand at an increased $CO_2$ production of 2.37 tons, while carbon minimization only reduced carbon emissions by 14 tons at a 26.12-thousand-dollar price increase. Co-optimization was found to reduce costs by 100.12 thousand dollars while also reducing carbon emissions by 12.49 tons. This indicates an unexpected result, whereby both costs and carbon emissions may be reduced in amounts nearly equal to amounts saved by optimization of either variable alone. This demonstrates that optimization processes as disclosed herein may achieve near-optimal emission reductions with little impact on cost savings, producing a tenable carbon-reduction option where none previously existed.

Still referring to FIG. 4, computing device 104 may provide an application programmer interface (API) to one or more client devices 156. API may provide data fields corresponding to any or all received, stored, and/or generated as described above. Data fields may provide, without limitation, carbon intensity data such as production-based carbon intensity and/or consumption-based carbon intensity and/or marginal carbon intensity. Data fields may provide metadata such as emission factors for fuel types as described above, data sources, and/or units of data. Data fields may provide temporal data such as a start date for a given set of data. Data fields may provide forecast data such as a forecast horizon in units of time such as minutes, seconds, hours, days, or the like, a production-based carbon intensity and/or a consumption-based carbon intensity and/or a marginal carbon intensity. Data fields may include one or more additional elements such as time of insertion of data, an identifier of a marginal source, a raw start date, defined as a time at which raw data was created, a source for fuel mix data, and/or a unit of measurement for data, such as pounds per Megawatt-hour. Data fields may provide a region for which data is applicable. API may be implemented as a two-way for interchange of information.

FIGS. 8-11 are screenshots of a user interface, showing, respectively, graphs tracking net energy consumption against a peak energy consumption value, past cost, consumption, and carbon dioxide emission year to date and projected, for instance as calculated above, a graphical comparison of cost and carbon savings as calculated using optimization algorithms as described above, and a scatter plot indicating a distribution of daily power peaks by month, measured against a projected maximal peak.

Systems and methods described herein integrate real-time emissions with energy and sustainability management, to determine how to estimate real-time carbon emissions and learn grid carbon intensity models, how to leverage real-time data to improve sustainability, how to make real-time control decisions under uncertainties of the ambient environment and user behaviors, and the like by uncovering hitherto arcane information about real-time carbon signals from a grid and proposed technology aims, to achieve economics and sustainability objectives simultaneously. Use of machine-learning and real-time data collection, coupled with optimization programs to generate recommended courses of action, enables previously unavailable clarity regarding impacts of various decisions and optimal courses of action to be taken in managing a power grid.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 12:
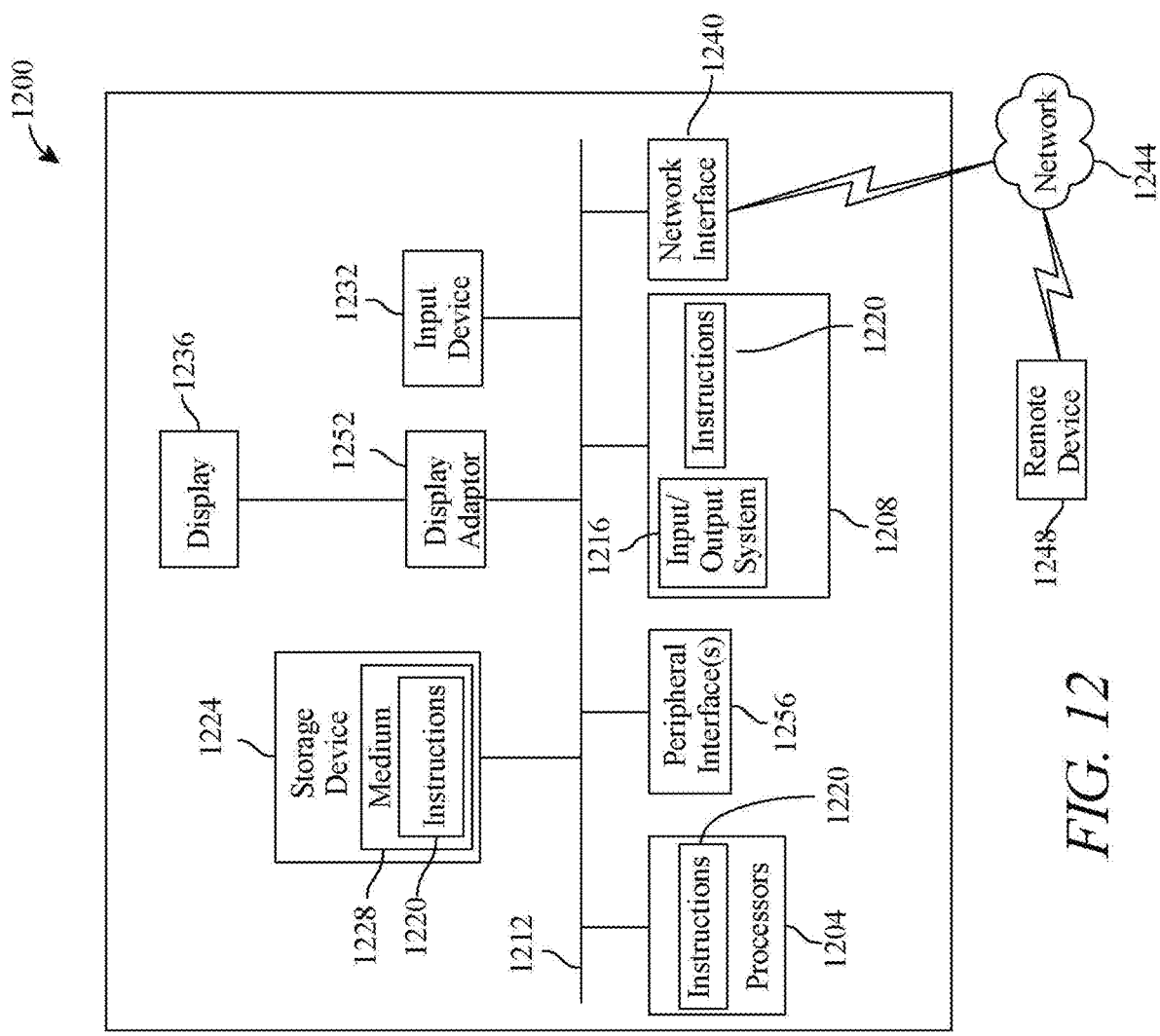
FIG. 12 is a block diagram of a computing system that can be used to implement any one or more of the methodologies disclosed herein and any one or more portions thereof.

FIG. 12 shows a diagrammatic representation of one embodiment of a computing device in the exemplary form of a computer system 1200 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1200 includes a processor 1204 and a memory 1208 that communicate with each other, and with other components, via a bus 1212. Bus 1212 may include any of several types of bus structures including, but not limited to, a memory bus, a memory controller, a peripheral bus, a local bus, and any combinations thereof, using any of a variety of bus architectures.

Processor 1204 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1204 may be organized according to Von Neumann and/or Harvard architecture as a non-limiting example. Processor 1204 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 1208 may include various components (e.g., machine-readable media) including, but not limited to, a random-access memory component, a read only component, and any combinations thereof. In one example, a basic input/output system 1216 (BIOS), including basic routines that help to transfer information between elements within computer system 1200, such as during start-up, may be stored in memory 1208. Memory 1208 may also include (e.g., stored on one or more machine-readable media) instructions (e.g., software) 1220 embodying any one or more of the aspects and/or methodologies of the present disclosure. In another example, memory 1208 may further include any number of program modules including, but not limited to, an operating system, one or more application programs, other program modules, program data, and any combinations thereof.

Computer system 1200 may also include a storage device 1224. Examples of a storage device (e.g., storage device 1224) include, but are not limited to, a hard disk drive, a magnetic disk drive, an optical disc drive in combination with an optical medium, a solid-state memory device, and any combinations thereof. Storage device 1224 may be connected to bus 1212 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1224 (or one or more components thereof) may be removably interfaced with computer system 1200 (e.g., via an external port connector (not shown)). Particularly, storage device 1224 and an associated machine-readable medium 1228 may provide nonvolatile and/or volatile storage of machine-readable instructions, data structures, program modules, and/or other data for computer system 1200. In one example, software 1220 may reside, completely or partially, within machine-readable medium 1228. In another example, software 1220 may reside, completely or partially, within processor 1204.

Computer system 1200 may also include an input device 1232. In one example, a user of computer system 1200 may enter commands and/or other information into computer system 1200 via input device 1232. Examples of an input device 1232 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1232 may be interfaced to bus 1212 via any of a variety of interfaces (not shown) including, but not limited to, a serial interface, a parallel interface, a game port, a USB interface, a FIRE-WIRE interface, a direct interface to bus 1212, and any combinations thereof. Input device 1232 may include a touch screen interface that may be a part of or separate from display 1236, discussed further below. Input device 1232 may be utilized as a user selection device for selecting one or more graphical representations in a graphical interface as described above.

A user may also input commands and/or other information to computer system 1200 via storage device 1224 (e.g., a removable disk drive, a flash drive, etc.) and/or network interface device 1240. A network interface device, such as network interface device 1240, may be utilized for connecting computer system 1200 to one or more of a variety of networks, such as network 1244, and one or more remote devices 1248 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1244, may employ a wired and/or a wireless mode of communication. In general, any network topology may be used. Information (e.g., data, software 1220, etc.) may be communicated to and/or from computer system 1200 via network interface device 1240.

Computer system 1200 may further include a video display adapter 1252 for communicating a displayable image to a display device, such as display device 1236. Examples of a display device include, but are not limited to, a liquid crystal display (LCD), a cathode ray tube (CRT), a plasma display, a light emitting diode (LED) display, and any combinations thereof. Display adapter 1252 and display device 1236 may be utilized in combination with processor 1204 to provide graphical representations of aspects of the present disclosure. In addition to a display device, computer system 1200 may include one or more other peripheral output devices including, but not limited to, an audio speaker, a printer, and any combinations thereof. Such peripheral output devices may be connected to bus 1212 via a peripheral interface 1256. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A method of machine-learning for prediction of grid carbon emissions, the method comprising:
  receiving, by a computing device and from a first local grid monitoring device monitoring a first local grid, at least a first power output quantity of a plurality of power generators in the first local grid;
  training, by the computing device, an emission projection machine-learning process,
    wherein training further comprises:
      compiling a plurality of training data entries, each training data entry correlating a plurality of past power output quantities with at least a reported carbon emission datum; and
      training the emission projection machine-learning process using the plurality of training data entries;
  generating, by the computing device, using the emission projection machine-learning process, a projected carbon emission rate as a function of the at least a first power output quantity; and
  generating, by a user interface communicatively connected to the computing device, a plurality of display tabs associated with the first local grid, wherein the plurality of display tabs is configured to:
    display projected carbon emission data associated with the first grid, wherein the projected carbon emission data comprises the projected carbon emission rate;
    display real-time carbon emission data associated with the first local grid;
    display historical carbon emission data associated with the first local grid; and
    display analytics of carbon emission data associated with the first local grid, wherein the analytics of carbon emission data comprise an analysis of temporal patterns of carbon emission data associated with the first local grid which is generated, as a function of the real-time carbon emission data and the historical carbon emission data, by a clustering algorithm.

2. The method of claim 1, wherein receiving further comprises computing a degree of uncertainty of the at least a first power output quantity.

3. The method of claim 1, wherein:
receiving further comprises receiving at least a second power output quantity from a second local grid; and
generating the projected carbon emission rate further comprises generating as a function of the at least a second power output quantity.

4. The method of claim 1 further comprising determining a current carbon emission rate as a function of the at least a first power output quantity.

5. The method of claim 1 further comprising determining a marginal carbon emission rate.

6. The method of claim 1, wherein generating the projected carbon emission rate further comprises determining a projected marginal carbon emission rate.

7. The method of claim 1 further comprising determining past carbon tonnage produced as a function of the at least a first power output quantity.

8. The method of claim 1 further comprising determining a projected future carbon tonnage as a function of the projected carbon emission rate.

9. The method of claim 1 further comprising generating a power output recommendation minimizing carbon output.

10. The method of claim 1 further comprising generating a power output recommendation minimizing a function of carbon output and cost.

11. A system for machine-learning for prediction of grid carbon emissions, the system comprising a computing device configured to:
receive, from a first local grid monitoring device monitoring a first local grid, at least a first power output quantity of a plurality of power generators in the first local grid;
train an emission projection machine-learning process, wherein training further comprises:
compiling a plurality of training data entries, each training data entry correlating a plurality of past power output quantities with at least a reported carbon emission datum; and
training the emission projection machine-learning process using the plurality of training data entries;
generate, using the emission projection machine-learning process, a projected carbon emission rate as a function of the at least a first power output quantity; and
generate, by a user interface communicatively connected to the computing device, a plurality of display tabs associated with the first local grid, wherein the plurality of display tabs is configured to:
display projected carbon emission data associated with the first grid, wherein the projected carbon emission data comprises the projected carbon emission rate;
display real-time carbon emission data associated with the first local grid;
display historical carbon emission data associated with the first local grid; and
display analytics of carbon emission data associated with the first local grid, wherein the analytics of carbon emission data comprise an analysis of temporal patterns of carbon emission data associated with the first local grid which is generated, as a function of the real-time carbon emission data and the historical carbon emission data, by a clustering algorithm.

12. The system of claim 11, wherein receiving further comprises computing a degree of uncertainty of the at least a first power output quantity.

13. The system of claim 11, wherein:
receiving further comprises receiving at least a second power output quantity from a second local grid; and
generating the projected carbon emission rate further comprises generating as a function of the at least a second power output quantity.

14. The system of claim 11 wherein the computing device is further configured to determine a current carbon emission rate as a function of the at least a first power output quantity.

15. The system of claim 11 wherein the computing device is further configured to determine a current marginal carbon emission rate.

16. The system of claim 11 wherein the computing device is further configured to determine a projected marginal carbon emission rate.

17. The system of claim 11 wherein the computing device is further configured to determine past carbon tonnage produced as a function of the at least a first power output quantity.

18. The system of claim 11 wherein the computing device is further configured to determine a projected future carbon tonnage as a function of the projected carbon emission rate.

19. The system of claim 11 wherein the computing device is further configured to generate a power output recommendation minimizing carbon output.

20. The system of claim 11 wherein the computing device is further configured to generate a power output recommendation minimizing a function of carbon output and cost.

* * * * *